(12) United States Patent
Legerton et al.

(10) Patent No.: US 8,786,520 B2
(45) Date of Patent: Jul. 22, 2014

(54) SYSTEM AND APPARATUS FOR DISPLAY PANELS

(75) Inventors: Jerome Legerton, San Diego, CA (US); Randall Sprague, Hansville, WA (US)

(73) Assignee: Innovega, Inc., Hansville, WA (US)

( * ) Notice: Subject to any disclaimer, the term of this patent is extended or adjusted under 35 U.S.C. 154(b) by 909 days.

(21) Appl. No.: 12/767,329

(22) Filed: Apr. 26, 2010

(65) Prior Publication Data

US 2010/0265163 A1    Oct. 21, 2010

Related U.S. Application Data

(63) Continuation-in-part of application No. 12/204,567, filed on Sep. 4, 2008, now Pat. No. 8,520,309.

(60) Provisional application No. 61/179,657, filed on May 19, 2009.

(51) Int. Cl.
*G09G 5/00*    (2006.01)

(52) U.S. Cl.
USPC .................................................. 345/8; 345/7

(58) Field of Classification Search
USPC ........................................................ 345/7–9
See application file for complete search history.

(56) References Cited

U.S. PATENT DOCUMENTS

| | | | |
|---|---|---|---|
| 2,622,477 A * | 12/1952 | Bechtel | 351/55 |
| 3,304,145 A * | 2/1967 | Hamm | 351/130 |
| 3,420,006 A * | 1/1969 | Barnett | 451/283 |
| 3,471,976 A * | 10/1969 | Barnett | 451/42 |
| 3,637,416 A | 1/1972 | Misch et al. | |
| 3,794,414 A | 2/1974 | Wesley | |
| 3,973,837 A | 8/1976 | Page | |
| 4,166,255 A | 8/1979 | Graham | |
| 4,637,697 A * | 1/1987 | Freeman | 351/159.44 |
| 4,805,988 A | 2/1989 | Dones | |
| 5,035,473 A | 7/1991 | Kuwayama et al. | |

(Continued)

FOREIGN PATENT DOCUMENTS

FR    2681702    3/1993
GB    2272980    6/1994

(Continued)

OTHER PUBLICATIONS

Patent Cooperation Treaty, International Search Report & Written Opinion of the International Search Authority, PCT/US2009/055758, Oct. 29, 2010, 16 pages.

*Primary Examiner* — Christopher E Leiby
(74) *Attorney, Agent, or Firm* — Viksnins Harris & Padys PLLP

(57) ABSTRACT

Various embodiments of the present invention provide for systems and apparatuses directed toward using a display panel to processes display information and non-display information. Further embodiments, utilize a display panel in conjunction with a contact lens assembly configured to process the display information. In one embodiment of the invention, a display system is provided, comprising: a display panel disposed on a head-borne apparatus such that when a viewer is wearing the head-borne apparatus, the display panel is positioned in close proximity to an eye of the viewer such that the eye is unable to focus on the display panel unassisted; and a contact lens having focusing optics that assists the eye in focusing on the display panel. Within the display system, the display panel has pixels and is configured without focusing optics, thereby allowing light emitted by the pixels to diverge in an unfocused manner.

34 Claims, 20 Drawing Sheets

(56) References Cited

U.S. PATENT DOCUMENTS

| | | | |
|---|---|---|---|
| 5,044,743 A | 9/1991 | Ting | |
| 5,160,463 A | 11/1992 | Evans et al. | |
| 5,331,149 A * | 7/1994 | Spitzer et al. | 250/221 |
| 5,369,415 A | 11/1994 | Richard et al. | |
| 5,539,422 A * | 7/1996 | Heacock et al. | 345/8 |
| 5,625,372 A | 4/1997 | Hildebrand et al. | |
| 5,644,323 A | 7/1997 | Hildebrand et al. | |
| 5,648,789 A * | 7/1997 | Beadles et al. | 345/8 |
| 5,661,603 A * | 8/1997 | Hanano et al. | 359/622 |
| 5,691,797 A * | 11/1997 | Seidner et al. | 351/159.47 |
| 5,703,637 A * | 12/1997 | Miyazaki et al. | 348/53 |
| 5,757,458 A | 5/1998 | Miller et al. | |
| 5,786,883 A | 7/1998 | Miller et al. | |
| 5,822,036 A * | 10/1998 | Massie et al. | 351/219 |
| 5,905,561 A | 5/1999 | Lee et al. | |
| 5,973,845 A | 10/1999 | Hildebrand et al. | |
| 5,980,040 A | 11/1999 | Xu et al. | |
| 6,023,372 A * | 2/2000 | Spitzer et al. | 359/630 |
| 6,204,974 B1 | 3/2001 | Spitzer | |
| 6,217,171 B1 | 4/2001 | Auten et al. | |
| 6,284,161 B1 | 9/2001 | Thakrar et al. | |
| 6,353,422 B1 * | 3/2002 | Perlman | 345/7 |
| 6,384,982 B1 | 5/2002 | Spitzer | |
| 6,452,572 B1 | 9/2002 | Fan et al. | |
| 6,614,408 B1 * | 9/2003 | Mann | 345/8 |
| 6,682,195 B2 * | 1/2004 | Dreher | 351/204 |
| 6,747,611 B1 * | 6/2004 | Budd et al. | 345/7 |
| 6,771,423 B2 | 8/2004 | Geist | |
| 6,816,314 B2 * | 11/2004 | Shimizu et al. | 359/630 |
| 6,874,888 B1 * | 4/2005 | Dudai | 351/159.27 |
| 7,048,378 B2 | 5/2006 | Chen | |
| 7,329,001 B2 | 2/2008 | Benrashid et al. | |
| 7,375,701 B2 * | 5/2008 | Covannon et al. | 345/8 |
| 7,461,937 B2 | 12/2008 | Steffen et al. | |
| 7,637,617 B2 * | 12/2009 | Liu et al. | 351/221 |
| 7,898,502 B2 * | 3/2011 | Tanijiri et al. | 345/7 |
| 8,154,804 B2 * | 4/2012 | McGinn et al. | 359/666 |
| 8,182,084 B2 * | 5/2012 | Kozaki et al. | 351/44 |
| 8,215,770 B2 * | 7/2012 | Blum et al. | 351/159.03 |
| 8,337,015 B2 * | 12/2012 | Sugihara et al. | 351/158 |
| 8,378,924 B2 * | 2/2013 | Jacobsen et al. | 345/7 |
| 8,390,533 B2 * | 3/2013 | Yamamoto | 345/7 |
| 2001/0050750 A1 * | 12/2001 | Breger | 351/161 |
| 2002/0030639 A1 * | 3/2002 | Shimizu et al. | 345/32 |
| 2002/0030693 A1 * | 3/2002 | Baldwin | 345/620 |
| 2003/0038912 A1 | 2/2003 | Broer et al. | |
| 2004/0041747 A1 | 3/2004 | Uehara et al. | |
| 2005/0088593 A1 | 4/2005 | Yamauchi | |
| 2005/0099594 A1 * | 5/2005 | Blum et al. | 351/160 R |
| 2005/0270474 A1 * | 12/2005 | Odhner | 351/41 |
| 2006/0072215 A1 * | 4/2006 | Nishi | 359/708 |
| 2006/0192908 A1 | 8/2006 | Tzschoppe et al. | |
| 2006/0203323 A1 | 9/2006 | Tonar et al. | |
| 2006/0227067 A1 * | 10/2006 | Iwasaki | 345/8 |
| 2007/0052886 A1 | 3/2007 | Fan | |
| 2007/0091037 A1 * | 4/2007 | Lee | 345/84 |
| 2007/0097066 A1 | 5/2007 | Ward | |
| 2007/0177156 A1 | 8/2007 | Mansfield | |
| 2007/0291224 A1 | 12/2007 | Lai | |
| 2008/0002262 A1 * | 1/2008 | Chirieleison | 359/630 |
| 2008/0122865 A1 | 5/2008 | Vanmoor | |
| 2008/0143639 A1 * | 6/2008 | Gerbe et al. | 345/8 |
| 2008/0143693 A1 * | 6/2008 | Schena | 345/179 |
| 2008/0185193 A1 | 8/2008 | Lin | |
| 2008/0309586 A1 * | 12/2008 | Vitale | 345/8 |
| 2009/0059164 A1 * | 3/2009 | Steffen et al. | 351/160 H |
| 2009/0091613 A1 | 4/2009 | Louwsma et al. | |
| 2009/0096937 A1 * | 4/2009 | Bauer et al. | 348/739 |
| 2009/0116096 A1 | 5/2009 | Zalevsky et al. | |
| 2009/0180194 A1 * | 7/2009 | Yamaguchi et al. | 359/630 |
| 2009/0189974 A1 | 7/2009 | Deering | |
| 2010/0045571 A1 * | 2/2010 | Yamamoto | 345/8 |
| 2010/0053030 A1 * | 3/2010 | Sprague | 345/7 |
| 2010/0053121 A1 * | 3/2010 | Sprague | 345/204 |
| 2010/0053549 A1 | 3/2010 | Legerton et al. | |
| 2010/0079356 A1 * | 4/2010 | Hoellwarth | 345/8 |
| 2010/0149618 A1 * | 6/2010 | Sprague | 359/259 |
| 2010/0245398 A1 * | 9/2010 | Amino | 345/690 |
| 2011/0096100 A1 | 4/2011 | Sprague | |
| 2013/0038520 A1 * | 2/2013 | Osman | 345/156 |

FOREIGN PATENT DOCUMENTS

| | | |
|---|---|---|
| GB | 2292248 | 2/1996 |
| WO | WO 91/06031 | 5/1991 |
| WO | WO 01/45080 | 6/2001 |

* cited by examiner

SYSTEM AND APPARATUS FOR DISPLAY PANELS

RELATED APPLICATION

This application claims the benefit of U.S. Provisional Patent Application Ser. No. 61/179,657 filed May 19, 2009, and also is a continuation-in-part of and claims the benefit of U.S. patent application Ser. No. 12/204,567 filed Sep. 4, 2008, now U.S. Pat. No. 8,520,309 both of which are hereby incorporated herein by reference in their entireties.

FIELD OF THE INVENTION

The present invention is related to optics and, more specifically, is directed toward optical processing of display information and non-display information using display panels.

DESCRIPTION OF THE RELATED ART

Current systems for optical processing of display information provided by a head-mounted display and non-display information provided by objects other than the head-mounted display have characteristics that make them unattractive solutions for many applications. The twin requirements of a large field of view and a comfortable eye-to-system distance for the viewer result in multi-component optical systems where the final optical component has a large diameter. Such systems tend to be large, bulky and ill suited for applications where little space is available for processing the display information and the non-display information. For example, such systems are unattractive solutions for processing display and non-display information in a fighter pilot's helmet where the space for the optical system is limited.

BRIEF SUMMARY OF EMBODIMENTS OF THE INVENTION

Various embodiments of the present invention provide systems and apparatuses directed toward using a display panel to process display information and non-display information. Further embodiments utilize a display panel in conjunction with a contact lens assembly configured to process the display information.

In one embodiment of the invention, a display system is provided, comprising: a display panel disposed on a head-borne apparatus such that when a viewer is wearing the head-borne apparatus, the display panel is positioned in close proximity to an eye of the viewer such that the eye is unable to focus on the display panel unassisted; and a contact lens having focusing optics that assists the eye in focusing on the display panel. Within the display system, the display panel has pixels and is configured without focusing optics, thereby allowing light emitted by the pixels to diverge unfocused.

In further embodiments, the focusing optics includes a lens that may be 25 or more diopters. Some embodiments may have a lens with a power of 40 diopters or greater.

The display panel in some embodiments is further disposed on the head-borne apparatus such that an image surface of the display panel is at a first horizontal angle with respect to a line of sight of a human visual system. The first angle may be between 45 and 135 degrees. In yet other embodiments, the display panel is configured such that the Z angle is adjustable.

In particular embodiments, the display panel is further disposed such that the display panel has an orientation about a Z-axis. The display panel in some such embodiments may be rotated about the Z-axis less than 45 degrees relative to the horizontal plane. Alternatively, the embodiment may be configured such that the orientation of the display panel about the first axis is adjustable.

In additional embodiments, the display panel is further disposed such that the display panel has a location along a Z-axis, which may be defined by a line of sight of the human visual system. The display panel in yet further embodiments is positioned between 5 and 50 millimeters from the eye.

In further embodiments, the display panel is further disposed such that the display panel has an X orientation and a Y orientation about a gaze axis. In some such embodiments, a geometric center deviates less than 10 millimeters in either the X orientation or the Y orientation with respect to the gaze axis. In other embodiments, the geometric center of the display panel has an adjustable X position and an adjustable Y position.

In some embodiments, the display panel is configured with a display panel image that is controlled to maintain a desired perimetric shape. In some such embodiments, the display panel image is determined by an electronic trapezoidal distortion correction. Optionally, the perimetric shape may be adjustable. In alternative embodiments, the display panel has a display panel image that is modulated to compensate for angular misalignment with a visual axis.

Further embodiments of the invention provide a display system, comprising: a first display panel disposed on a head-borne apparatus such that when a viewer is wearing the head-borne apparatus, the first display panel is positioned in close proximity to a first eye of the viewer such that the first eye is unable to focus on the first display panel unassisted, and such that a first geometric center of the first display panel is set to a first position relative to a first anatomic center of a first pupil of the first eye for a first defined plane of gaze; and a second display panel disposed on the head-borne apparatus such that when the viewer is wearing the head-borne apparatus, the second display panel is positioned in close proximity to a second eye of the viewer such that the second eye is unable to focus on the second display panel unassisted, and such that a second geometric center of the second display panel is set to a second position relative to a second anatomic center of a second pupil of the second eye for a second defined plane of gaze. Such a system further comprises a first contact lens having focusing optics that assists the first eye in focusing on the display panel; and a second contact lens having focusing optics that assists the second eye in focusing on the display panel; wherein both the first and second display panels have pixels, and are configured without focusing optics, thereby allowing light emitted by the pixels to diverge unfocused.

In further embodiments, the first position of the first geometric center is substantially equal to a first pupillary distance measure at a gaze of approximately 6 meters or greater, and the second position of the second geometric center is substantially equal to a second pupillary distance measure at a gaze of approximately 6 meters or greater. In alternative embodiments, the first and second pupillary distance measure may be approximately 1 to 6 meters, or less than 1 meter.

Additionally, the first position of the first geometric center may be determined by a first measurement of the first eye from a first midline position of the head-borne apparatus, and the second position of the second geometric center may be determined by a second measurement of the second eye from a midline position of the head-borne apparatus. Alternatively, in some embodiments, the first position of the first geometric center may be determined by a first measurement of a first vertical difference of a first height of a first pupil center of the first eye from a horizontal position of the head-borne apparatus, and the second position of the second geometric center may be determined by a second measurement of a second vertical difference of a second height of a second pupil center of the second eye from a horizontal position of the head-borne apparatus. Optionally, in some embodiments, the first position of the first and second geometric centers may be respectively adjustable.

In certain embodiments, the display panel has a display panel surface that is curved at a predetermined curvature that is spherical, cylindrical, aspherical, or rotationally asymmetrical. In some such embodiments, the predetermined curvature conforms to a corresponding curvature of a spectacle lens. In further embodiments, the curvature of the display could be achieved by a curved fiber optic faceplate. This allows the use of flat panel displays and create a resultant curvature of the surface that is viewed by the eye.

In additional embodiments, the display panel has a display panel pixel size that subtends an angle approximately less than 6 minutes of arc. In further embodiments, the display panel has a display pixel size that subtends an angle approximately less than 2 minutes of arc.

In some embodiments, the display panel as seen by the viewer has brightness that is approximately between 0.5 and 400 $Cd/m^2$. In other embodiments, the display panel as seen by the viewer has brightness that is approximately between 50 and 3000 $Cd/m^2$. In some embodiments, the display panel as seen by the viewer has brightness that is adjustable.

In another embodiment of the invention, the display panel as seen by the viewer occupies a field of view that is approximately between 15 and 120 degrees. In a further embodiment, the display panel as seen by the viewer occupies a field of view that is greater than a first field of view the viewer can see at a single gaze angle. In some such embodiments, the areas of the display panel not seen by the single gaze angle may be seen simply by changing the gaze angle.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1A:
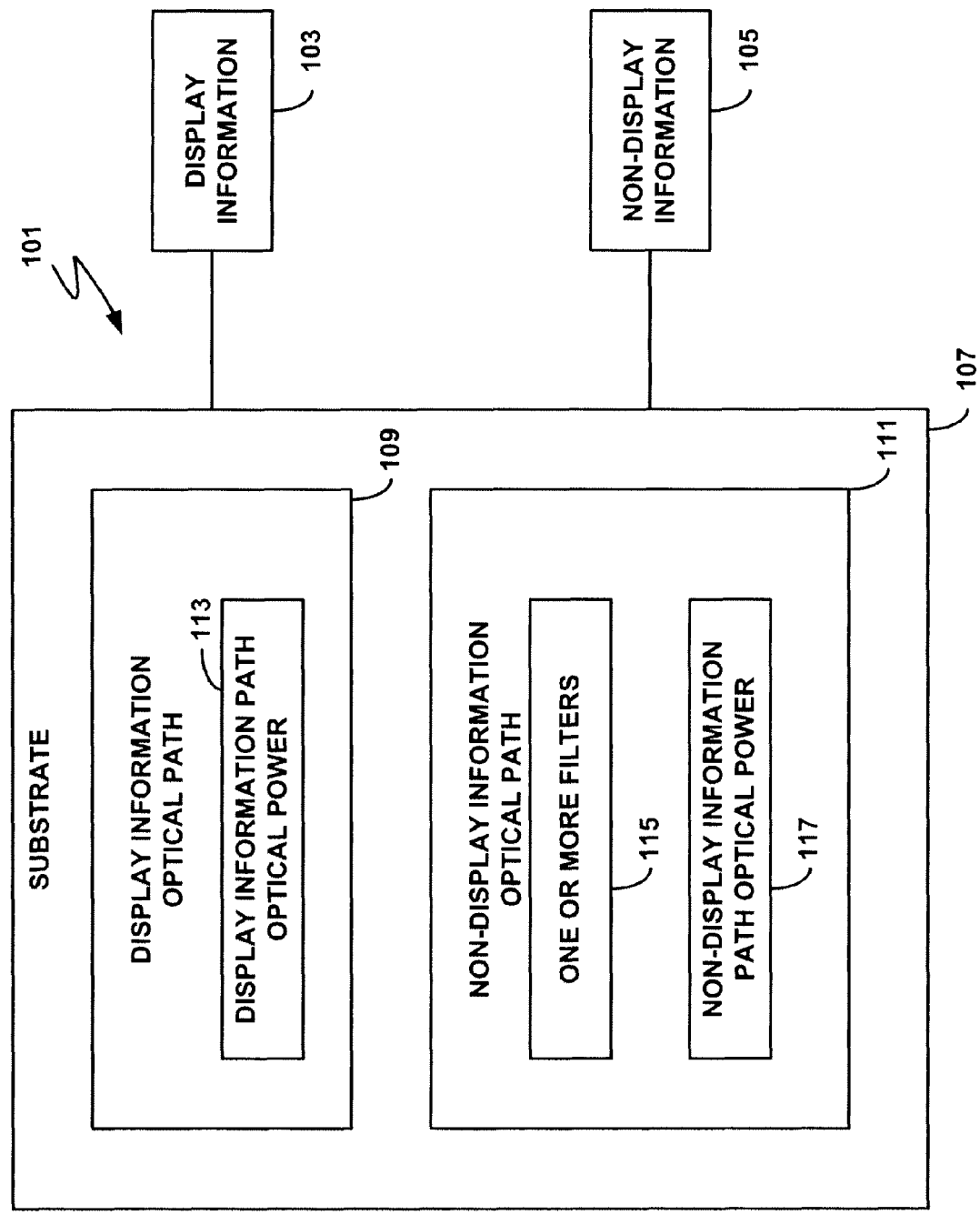
FIG. 1A is a block diagram of an example apparatus to receive and process display information and non-display information in accordance with some embodiments of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and apparatuses using a contact lens to implement deflection optics. In some embodiments, a contact lens assembly in accordance with the present invention is configured to combine and process non-display information originating from the real world environment, with display information emanating from a display that may be positioned off-axis with respect to the human visual system (e.g., human eye).

For example, in one embodiment of the invention, deflection optics embedded into a contact lens assembly makes it possible for viewing a display indirectly (as a virtual image) or directly. In another embodiment of the invention, an area within a contact lens assembly is provided such that the area enables indirect viewing of a display. In further embodiments, a contact lens assembly is configured with three concentric regions, the center region having deflection optics providing indirect viewing of display information, the intermediary region providing direct viewing of display information, and the outside region providing ambient viewing. In yet a further embodiment, a contact lens assembly is configured with a direct viewing region and an indirect viewing region having deflection optics positioned side-by-side in the center of the contact lens assembly, with a surrounding ambient viewing region. In a further embodiment, a contact lens assembly is configured with deflective optics and a filter (e.g., broadband filter, narrowband filter, polarizer filter, etc.) such that the deflective optics and the filter work together to enhance direct viewing and indirect viewing.

The term contact lens as used in this description is any optical system that has optical elements and is in contact with the ocular tissue. This includes any hybrid, gas permeable, soft, hard, corneal, or scleral contact lens, and any interocular or intra-ocular device. Though the embodiments to follow are described in terms of a contact lens, one of ordinary skill in the art will appreciate after reading the following description that any of the optical systems described above could be used in place of a contact lens without deviating from the scope or principles of the present invention.

The term substrate as used in the following description includes any material or substance used to form an optical component such as a contact lens. The term zone plate includes an optical component that focuses light by diffraction. The term display information optical path includes the optical path traversed in a substrate by display information. The term non-display information optical path includes the optical path traversed in a substrate by non-display information. For some embodiments, non-display information may include what is perceived in the real world by a human eye. The term optically coupled includes two or more optical components connect by an optical path.

The term non-display information path optical power includes the optical power provided in a substrate for an optical signal passing through the non-display information path. The term substantially zero power includes an optical power that has substantially no effect on an optical signal. The term normal power is the optical power necessary to provide correction in an optical system, such as a human visual system, for defects in the optical system. The term close power is the optical power necessary to provide correction in an optical system, such as a human visual system, for viewing at a close distance.

The term optical path optics in this description includes objects and laminates disposed on or within a contact lens such that the object or laminate affects light rays in a given optical path. Such objects can be fully or partially embedded within a contact lens, or laminates disposed on or within a contact lens.

The term electromagnetic radiation includes energy in the form of transverse electric and magnetic waves. The term electromagnetic radiation includes electromagnetic radiation in the visible spectrum. The term illuminating includes directing or transmitting electromagnetic radiation to a target.

The term filter includes apparatus or methods for selectively transmitting electromagnetic radiation. The term characteristic feature includes detectable traits, such as narrow bandwidth or polarization, by which signals can be distinguished.

The term notch filter includes a filter that blocks electromagnetic radiation over a substantially continuous narrow band of frequencies. The term non-display path notch filter includes a notch filter included in the non-display path of a substrate.

The term bandpass filter includes a filter that transmits electromagnetic radiation over a substantially continuous but finite band of frequencies. The term display path bandpass filter includes a bandpass filter included in the display path of a substrate.

The term polarizing filter includes a filter that polarizes electromagnetic radiation. The term display path polarizing filter includes a polarizing filter included in the display information path of a substrate. The term non-display path polarizing filter includes a polarizing filter included in the non-display information path of a substrate. The term shutter includes a controllable polarizing filter. The term substantially opaque filter includes a filter that blocks all or nearly all of the information received by the filter.

The term display includes any apparatus capable of generating information in the form of electromagnetic radiation. The term organic light emitting diode display includes one or more light-emitting diodes whose light emitting layer includes a film of one or more organic compounds. The term display information includes information provided by a display.

The term controllable optical materials includes materials whose optical properties, such as opacity, can be controlled. The term photochromic material includes materials whose optical properties can be controlled by an optical signal. The term, electrochromic material includes an optical material whose properties can be controlled by an electrical signal. The term optical material activation signal includes signals to control the optical properties of a controllable optical material.

The term a pattern of pixel sites includes the organization of pixel sites on a substrate. The term substantial transparent pixel unit includes a portion of a display that transmits electromagnetic radiation generated outside the display. The term checkerboard pattern includes an alternating pattern similar to the pattern of a checkerboard.

In some embodiments, as illustrated and described herein, information provided by a head-mounted display, referred to as display information, and information provided by objects other than the head-mounted display, referred to as non-display information, are received at a contact lens included in a human visual system. A head-mounted display may include an organic light emitting diode display to provide the display information. The contact lens in combination with the human visual system provides images of the display information and the non-display information to the retina of the human visual system. The display information may include, for example, text information, non-text information or other visual information. The non-display information may include, for example, landscape information, non-landscape information, and other visual information.

The contact lens includes a display information optical path and a non-display information optical path. The display information optical path provides a contact lens transmission path between the head-mounted display and the human visual system for the display information transmitted by the head-mounted display. The display information optical path forms a substantially cylindrical central region of the contact lens. The display information optical path in the contact lens can provide power to assist the human visual system in focusing objects positioned close to the human lens.

The non-display information optical path provides a contact lens transmission path between the source of the non-display information and the human visual system for the non-display information. The non-display information optical path forms a substantially annular ring surrounding the cylindrical central region of the display information optical path. A filter is included in the non-display information optical path to substantially block display information from being transmitted through the non-display information optical path. The non-display information optical path in the contact lens may provide correction for defects, such as nearsightedness, farsightedness, and astigmatism in the human visual system.

The display information and the non-display information may be polarized to different polarizations to provide for distinguishing between the display information and the non-display information. Polarizing the display information and the non-display information enables independent processing of the display information and non-display information at the contact lens and enables time-domain multiplexing in the transmission of the display information and the non-display information to the contact lens. The time-domain multiplexed display information and non-display information when processed by the human visual system are perceived as a single image. Further detailed description of these and other embodiments is provided below.

FIG. 1A shows a block diagram of an apparatus 101 to receive and process display information 103 and non-display information 105 in accordance with some embodiments. The apparatus 101 includes a substrate 107 including a display information optical path 109 to receive the display information 103 and a non-display information optical path 111 to receive the non-display information 105. The display information optical path 109 includes a display information path optical power 113. The non-display information optical path 111 includes one or more filters 115 and a non-display information path optical power 117.

The substrate 107 is not limited to being formed from a particular material or combination of materials. Materials suitable for use in forming optical components, such as lenses, may be used in forming the substrate 107. Exemplary materials suitable for use in forming the substrate 107 include gels, such as silicone hydrogels, glasses, plastics, and polymers, such as polymethyl methacrylate and polymacon. The substrate 107 is not limited to a particular type of optical component. In some embodiments, the substrate 107 includes a substrate or blank suitable for forming one lens, such as a contact lens. In some embodiments, the substrate 107 includes one or more optical components or lenses, such as focusing lenses, formed from one or more optical materials. In certain embodiments, the substrate 107 is formed from a flexible material conformable to the shape of a human cornea. In some embodiments, the substrate 107 is formed by filling a contact lens mold with one or more liquid polymers.

The display information 103 includes electromagnetic radiation, such as visible light, having at least one characteristic feature lacking in the non-display electromagnetic radiation of the non-display information 105. For example, in some embodiments, the display information 103 includes electromagnetic radiation having a narrow spectral bandwidth while the non-display information 105 includes electromagnetic radiation having a broad spectral bandwidth. Narrow spectral bandwidth and broad spectral bandwidth are relative terms. In some embodiments, for two signals, the signal having the narrower spectral bandwidth information is the signal having a narrow spectral bandwidth and the signal having the broader spectral bandwidth information is the signal having a broad spectral bandwidth. In some embodiments, narrow spectral bandwidth information includes information having a bandwidth of between about a few nanometers and a few tens of nanometers. In some embodiments, broad spectral bandwidth information includes information having a bandwidth greater than about a few tens of nanometers. Thus, the non-display electromagnetic radiation having a broad spectral bandwidth lacks the characteristic feature—narrow spectral bandwidth—included in the display information 103.

As a second example, in some embodiments, the display information 103 includes electromagnetic radiation having a display information polarization, such as right-handed circular polarization, and the non-display information 105 includes unpolarized information. Thus, the non-display information 105 including the non-display electromagnetic radiation having the unpolarized information lacks the characteristic feature—right handed circular polarization—included in the display information 103.

The display information optical path 109 is included in the substrate 107 and is formed from an optical material or combination of materials. The display information optical path 109 is not limited to being formed from a particular optical material or combination of materials. Materials suitable for use in forming the substrate 107 are suitable for use in forming the display infatuation optical path 109. The materials used to form the display information optical path 109 may differ from the one or more materials used to form the substrate 107.

In operation, the display information optical path 109 receives and transmits electromagnetic information, such as the display information 103. When coupled to a human visual system (as shown in FIG. 1B), the display information optical path 109 receives the display information 103 and assists the human visual system to substantially focus the display information 103 to a retina in the human visual system.

The non-display information optical path 111 is included in the substrate 107 and is formed from an optical material or combination of materials. The non-display information optical path 111 is not limited to being formed from a particular optical material or combination of materials. Materials suitable for use in forming the substrate 107 are suitable for use in forming the non-display information optical path 111. The materials used to form the non-display information optical path 111 may differ from the one or more materials used to form the substrate 107.

Figure 1B:
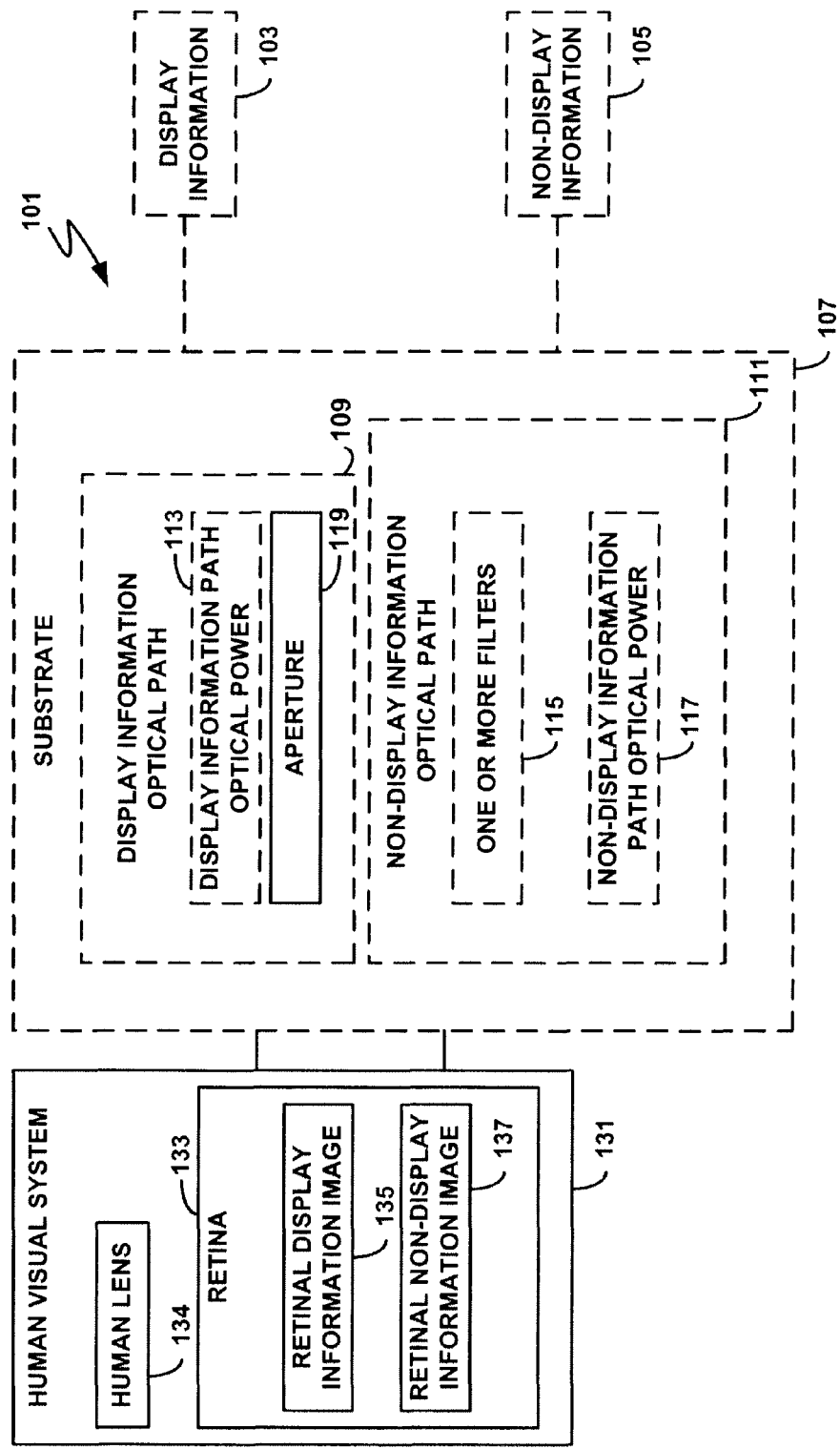
FIG. 1B is a block diagram of the example apparatus (shown in FIG. 1A) coupled to a human visual system in accordance with some embodiments of the present invention.

In operation, the non-display information optical path 111 receives the non-display information 105 and when coupled to a human visual system (as shown in FIG. 1B) substantially focuses the non-display information 105 to a retina in the human visual system. The non-display information 105 includes any information, such as visible objects, not included in the display information 103. In some embodiments, the non-display information 105 is provided from objects more distant from the human visual system than the source of the display information 103. For example, in some embodiments, the display information 103 is provided to a human visual system from a head-mounted display located between about 5 millimeters and about 200 millimeters from the cornea, and the non-display information 105 is provided to the human visual system from a source located at a distance of greater than about 200 millimeters from the cornea.

The one or more filters 115 included in the non-display information optical path 111 substantially block the display information 103 while substantially transmitting the non-display information 105. Each of the one or more filters 115 is sensitive to a physical characteristic, such as wavelength, frequency, or polarization, of the display information 103. Thus, the one or more filters 115 may include any filter or combination of filters or other optical components capable of substantially blocking the display information 103 while substantially transmitting the non-display information 105.

Optical power is the degree to which a lens or mirror converges or diverges light or electromagnetic radiation. A lens or mirror having substantially zero optical power neither converges nor diverges electromagnetic radiation. Normal power is the power necessary to provide correction in an optical system, such as a human visual system, for defects in the optical system. For example, normal power includes a power to correct for nearsightedness, farsightedness, or astigmatism in a human visual system. In some embodiments, a normal power is between about 0.25 and about 10 diopters.

Close power is the power necessary to provide correction in an optical system, such as a human visual system, for viewing at a close distance. In a human visual system, a close distance is a distance of less than about 250 millimeters. For objects closer than about 250 millimeters, the human visual system cannot form a sharp image on the retina. A focusing lens can provide close power to assist a human visual system in viewing objects at distances of less than about 250 millimeters. In some embodiments, the close power is between about 5 and about 200 diopters.

In some embodiments, the apparatus 101 includes combinations of optical powers. In some embodiments, the display information path optical power 113 includes substantially zero power and the non-display information path optical power 117 includes substantially zero power. In other embodiments, the display information path optical power 113 includes substantially zero power and the non-display information path optical power 117 includes a normal power. In further embodiments, the display information path optical power 113 includes a close power and the non-display information path optical power 117 includes substantially zero power. In additional embodiments, the display information path optical power 113 includes a close power and the non-display information path optical power 117 includes normal power. In additional embodiments, the non-display information path includes two or more optical powers. For example, some embodiments may use the two or more optical powers for correction of presbyopia or for enabling the eye to properly focus for two or more distances other than the display path.

FIG. 1B shows a block diagram of the apparatus 101 (shown in FIG. 1A) coupled to a human visual system 131 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117.

In some embodiments, the display information optical path 109 has an aperture 119. The aperture 119 may be sized to assist in focusing the display information 103. In some embodiments, the aperture 119 is sized to increase the depth of focus in the display information optical path 109. In some embodiments, the aperture 119 has a diameter of about one millimeter.

In operation, the display information optical path 109 and the non-display information optical path 111 assist the human visual system 131 in forming a focused image of the display information 103 and a focused image of the non-display information 105 on a retina 133. The display information optical path 109 in cooperation with the human visual system 131, including the human lens 134, substantially focuses the display information 103 to the retina 133 to form retinal display information image 135. The non-display information optical path 111 in cooperation with the human visual system 131, including the human lens 134, substantially focuses the non-display information 105 to the retina 133 to form retinal non-display information image 137. At least one of the one or more filters 115 in the non-display information optical path 111 substantially blocks the display information 103 from entering the human visual system 131 from the non-display information optical path 111.

Figure 1C:
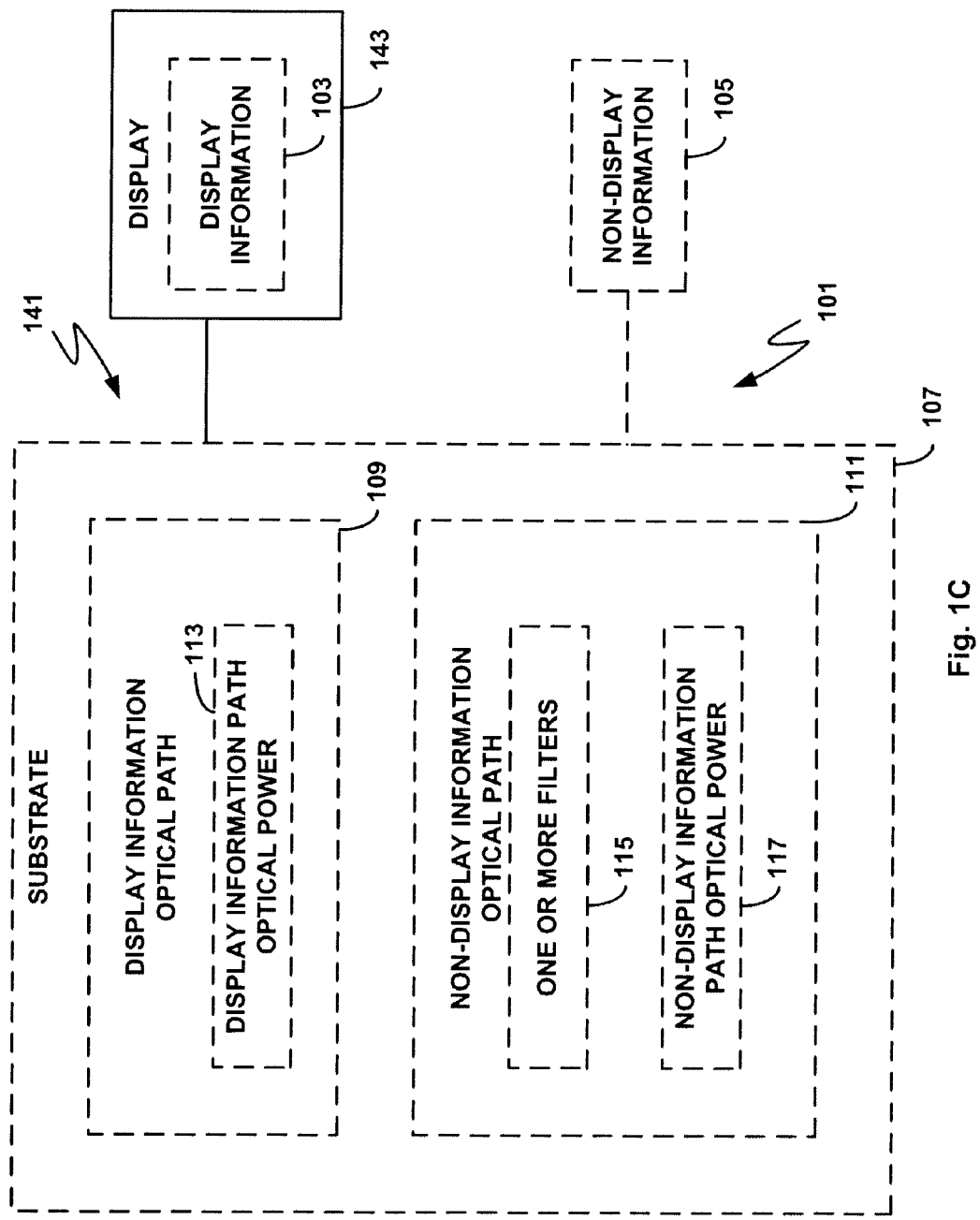
FIG. 1C is a block diagram of an example apparatus including the apparatus (shown in FIG. 1A), and further including a display to provide the display in accordance with some embodiments of the present invention.

FIG. 1C shows a block diagram of an apparatus 141 including the apparatus 101 (shown in FIG. 1A), and further including a display 143 to provide the display information 103 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117.

In some embodiments, the display information 103 includes information provided by the display 143. The display 143 includes any device or system that provides information in the form of electromagnetic radiation, such as visible light. For example, in some embodiments, the display information 103 is provided by a device including a single two-state source of visible light.

The display 143 is not limited to a particular type of display. In some embodiments, the display 143 includes microdisplays and other small displays, such as displays having a thickness of between about 100 microns and about two millimeters, flat screen displays, such as liquid crystal displays, and cathode ray tube displays. In some embodiments, the display 143 is mounted in an eyeglass frame. In operation, in some embodiments, the distance between the display and a human cornea is between about 5 millimeters and about 200 millimeters.

The display information 103 provided by the display 143 may include a characteristic feature related to the wavelength of the display information 103. In some embodiments, the display information 103 provided by the display 143 includes information having a narrow spectral bandwidth. Exemplary displays that provide the display information 103 having a narrow spectral bandwidth include organic light emitting diode displays and electroluminescent displays.

The display 143 is not limited to providing the display information 103. In some embodiments, the display 143 is substantially occluded, partially occluded, or substantially transparent. For a partially occluded or substantially transparent display, the display 143 may transmit the non-display information 105 in addition to providing the display information 103. An organic light emitting diode display is an exemplary display capable of providing substantially transparent, partially occluded, and substantially occluded operation.

Figure 1D:
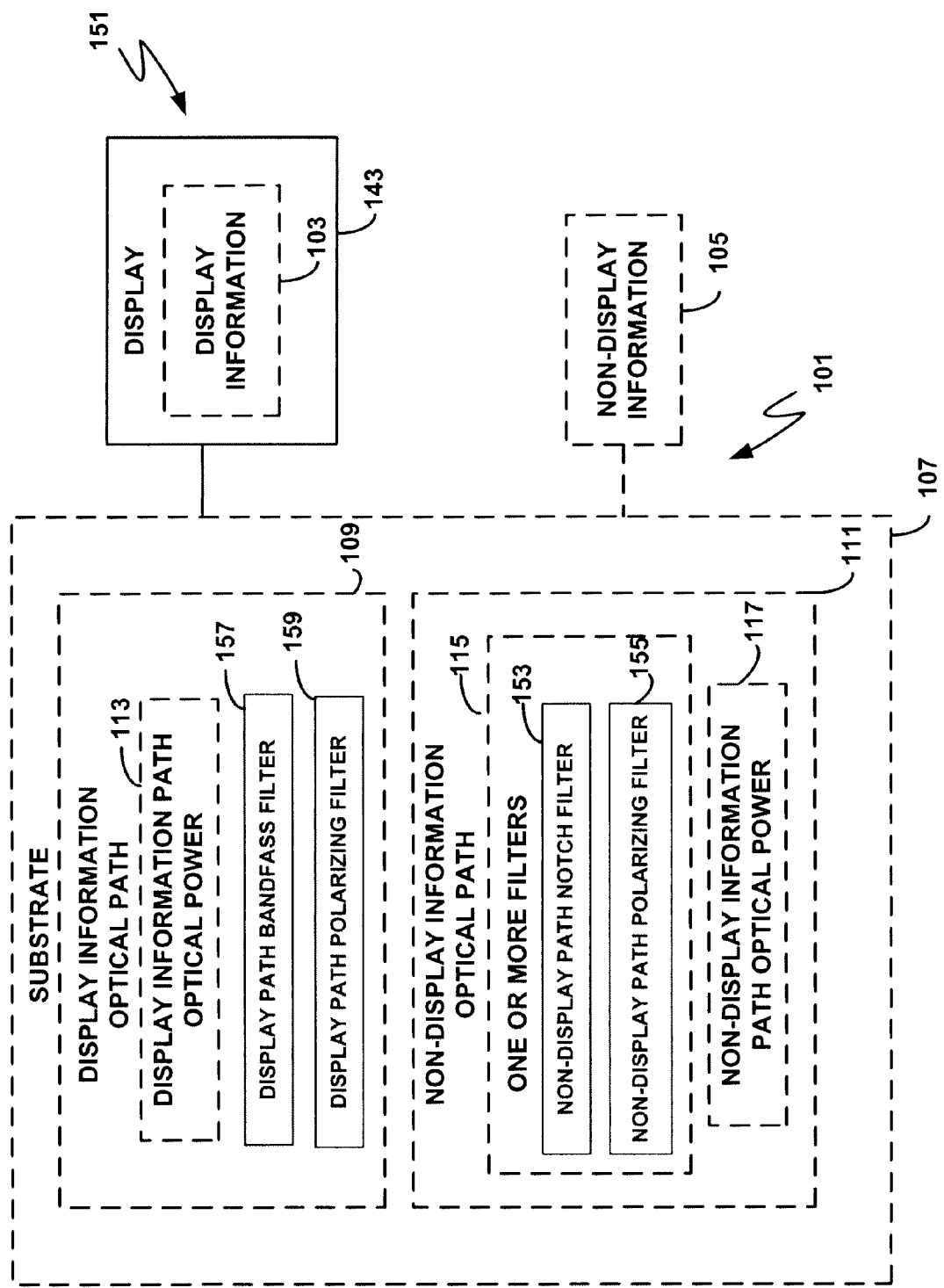
FIG. 1D is a block diagram of an example apparatus including the apparatus (shown in FIG. 1A), wherein at least one of the one or more filters (shown in FIG. 1A) includes a non-display path notch filter or a non-display path polarizing filter and further including the display (shown in FIG. 1C) to provide the display information (shown in FIG. 1A) in accordance with some embodiments of the present invention.

FIG. 1D shows a block diagram of an apparatus 151 including the apparatus 101 (shown in FIG. 1A), wherein at least one of the one or more filters 115 includes a non-display path notch filter 153 or a non-display path polarizing filter 155 and further including the display 143 to provide the display information 103 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117. In some embodiments, the display information optical path includes a display path bandpass filter 157. In other embodiments, the display information optical path includes a display path polarizing filter 159.

The non-display path notch filter 153 is selected to substantially block the display information 103 in the non-display information optical path 111. In some embodiments, the non-display path notch filter 153 is selected to block at least about 90% of the energy included in the display information 103. Blocking less than about 90% of energy included in the display information 103 may result in blurring of the display information 103 and the non-display information 105. The non-display path notch filter 153 is not limited to a particular type of notch filter. In some embodiments, the non-display path notch filter 153 includes a thin film interference filter, such as a rugate filter. Notch filters, such as the non-display path notch filter 153, are formed by periodically varying the refractive index in each of a plurality of discrete thin film layers included in a contact lens. Microlithographic processes can be applied to each of the plurality of discrete thin film layers to pattern the notch filters. The plurality of discrete thin film layers may be introduced into the contact lens during the molding of the lens.

In operation, the non-display path notch filter 153 is included in the non-display information optical path 111 to block narrow bandwidth electromagnetic radiation included in the display information 103. If the non-display information 105 includes broad spectral bandwidth electromagnetic radiation, the non-display path notch filter 153 has substantially no effect on the non-display information 105. The non-display information 105 passes through the non-display information optical path 111 substantially unchanged.

In some embodiments, the frequencies to be blocked by the non-display path notch filter 153 include the primary colors included in the spectrum of the display information 103. For example, for the display information 103 having primary colors red, green, and blue, the one or more filters 115 are selected to substantially block narrow spectrum red, green, and blue. In order to substantially block narrow spectrum red, green, and blue, the transmission curve includes "notches" or a transmission coefficient of substantially zero at the one or more bands of frequencies to be blocked. In some embodiments, the "notches" have a bandwidth that blocks a band of frequencies, such as, for example, a band of frequencies having a narrow spectrum of between about two and about thirty nanometers, centered on each of the primary colors, red, green, and blue.

The non-display path polarizing filter 155 is selected to substantially block the display information 103 in the non-display information optical path 111. The non-display path polarizing filter 155 is not limited to a particular type of polarizing filter. In some embodiments, the non-display path polarizing filter 155 includes a filter to substantially block right-handed circularly polarized radiation. In other embodiments, the non-display path polarizing filter 155 is selected to substantially block left-handed circularly polarized electromagnetic radiation. In further embodiments, the non-display path polarizing filter 155 is selected to substantially block linearly polarized electromagnetic radiation. Pixelated micro-wires and birefringent polymers are suitable for use in forming linear polarizers for use in forming polarizing filters, such as the non-display path polarizing filter 155. Circular polarizers are formed by adding a quarter wave-plate retarder in series with a linear polarizer.

In operation, the non-display path polarizing filter 155 is included in the non-display information optical path 111 to block polarized electromagnetic radiation included in the display information 103. For example, if the display information 103 includes left-handed circularly polarized electromagnetic radiation and the non-display information 105 includes right-handed circularly polarized electromagnetic radiation, the non-display path polarizing filter 155 is selected to substantially block the left-handed circularly polarized electromagnetic radiation while having substantially no effect on the right-handed circularly polarized electromagnetic radiation of the non-display information 105. The non-display information 105 passes through the non-display information optical path 111 substantially unchanged.

The display path bandpass filter 157 is selected to substantially block the non-display information 105 in the display information optical path 109. The display path bandpass filter 157 is not limited to a particular type of bandpass filter. In some embodiments, the display path bandpass filter 157 includes a thin film interference filter, such as a rugate filter. Bandpass filters, such as the display path bandpass filter 157, are formed by varying the refractive index in each of a plurality of thin films to selectively pass the desired wavelength bands and including the plurality of discrete thin film layers in a contact lens. Microlithographic processes can be applied to the plurality of thin films to pattern the bandpass filters. The plurality of discrete thin film layers may be introduced into the contact lens during the molding of the lens.

In operation, the display path bandpass filter 157 included in the display information optical path 109 is selected to substantially block broad spectral bandwidth electromagnetic radiation included in the non-display information 105. If the display information 103 includes narrow spectral bandwidth electromagnetic radiation substantially matched to the passband of the display path bandpass filter 157, the display path bandpass filter 157 has substantially no effect on the display information 103. The display information 103 passes through the display information optical path 109 substantially unchanged.

The display path polarizing filter 159 is selected to substantially block the non-display information 105 in the display information optical path 109. The display path polarizing filter 159 is not limited to a particular type of polarizing filter. In some embodiments, the display path polarizing filter 159 includes a linearly polarized filter.

In operation, the display path polarizing filter 159 is included in the display information optical path 109 to substantially block electromagnetic radiation included in the non-display information 105. If the display information 103 includes right-handed circularly polarized electromagnetic radiation and the display path polarizing filter 159 is selected to transmit right-handed circularly polarized electromagnetic radiation, the display path polarizing filter 159 has substantially no effect on the display information 103. The display information 103 passes through the display information optical path 109 substantially unchanged.

In some embodiments, in operation the apparatus 151 processes a combination of spectral bandwidths and polarizations in the display information 103 and the non-display information 105. In some embodiments, the display information 103 includes display electromagnetic radiation having a narrow spectral bandwidth and the non-display information 105 includes non-display electromagnetic radiation having a broad spectral bandwidth. In other embodiments, the display information 103 includes display electromagnetic radiation having a display information polarization and the non-display information 105 includes non-display electromagnetic radiation having a non-display information polarization. In further embodiments, the display information 103 includes display electromagnetic radiation having a narrow spectral bandwidth and a display information polarization and the non-display information 105 includes non-display electromagnetic radiation having a broad spectral bandwidth. In additional embodiments, the display information 103 includes display information including display electromagnetic radiation having a narrow spectral bandwidth and a display information polarization and the non-display information 105 including non-display electromagnetic radiation having a broad spectral bandwidth and a non-display information polarization.

Figure 1E:
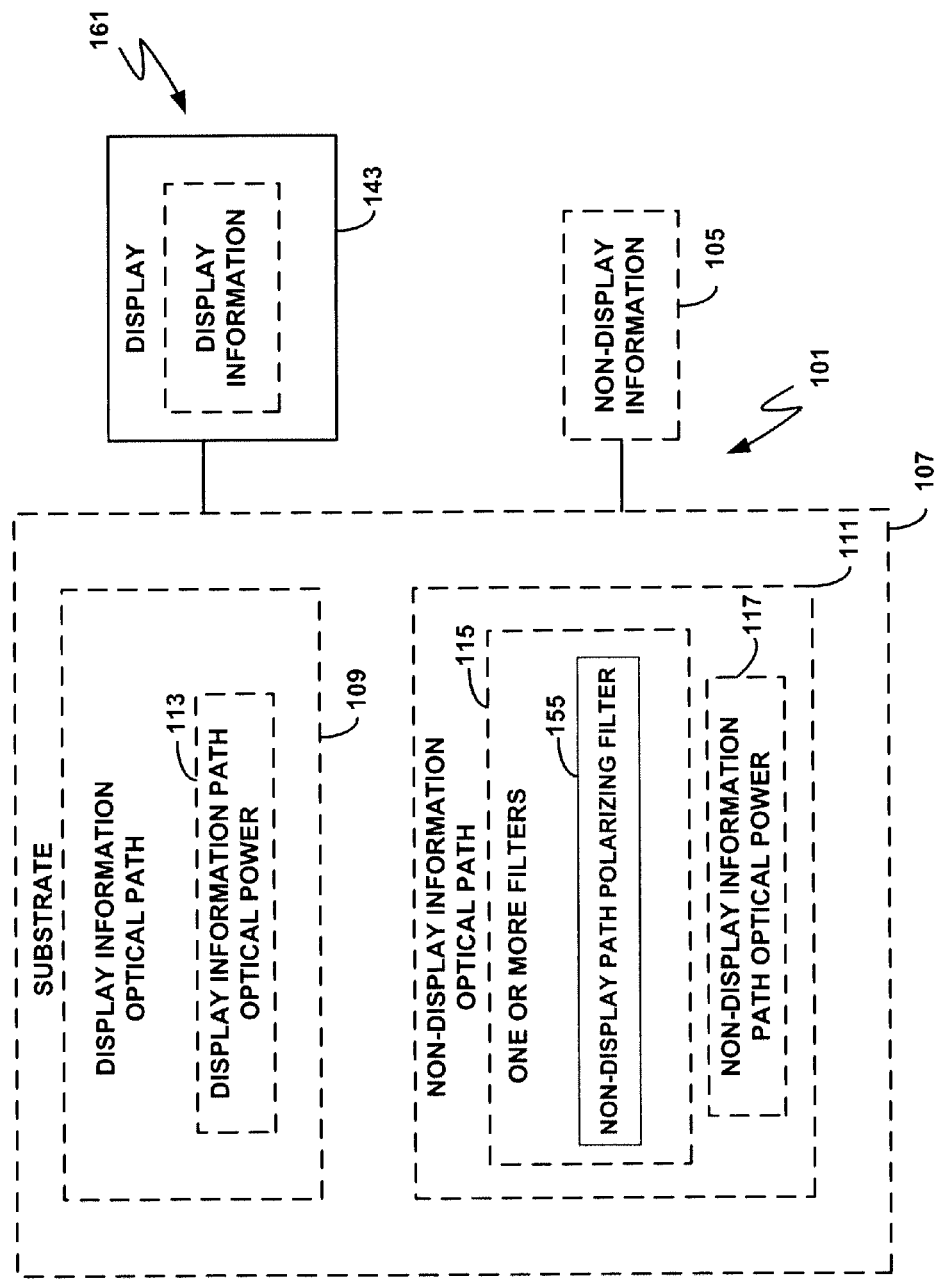
FIG. 1E is a block diagram of an example apparatus including the apparatus (shown in FIG. 1A), wherein the one or more filters include a non-display path polarizing filter (shown in FIG. 1D) and further including the display (shown in FIG. 1C) in accordance with some embodiments of the present invention.

FIG. 1E shows a block diagram of an apparatus 161 including the apparatus 101 (shown in FIG. 1A), wherein the one or more filters 115 includes the non-display path polarizing filter 155 (shown in FIG. 1D), and further including the display 143 (shown in FIG. 1C). The apparatus 101 includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117. The display information 103 includes electromagnetic radiation having a display information polarization. The non-display information 105 includes non-display electromagnetic radiation having a non-display information polarization.

The non-display path polarizing filter 155 is selected to block the display information 103. In some embodiments, the display information 103 includes electromagnetic radiation having the display information polarization. To block the display information 103, the non-display path polarizing filter 155 is selected to block electromagnetic radiation having the display information polarization. In some embodiments, the non-display information 105 includes the non-display electromagnetic radiation having the non-display information polarization. The non-display path polarizing filter 155 is selected to pass the non-display electromagnetic radiation having the non-display information polarization.

Figure 2A:
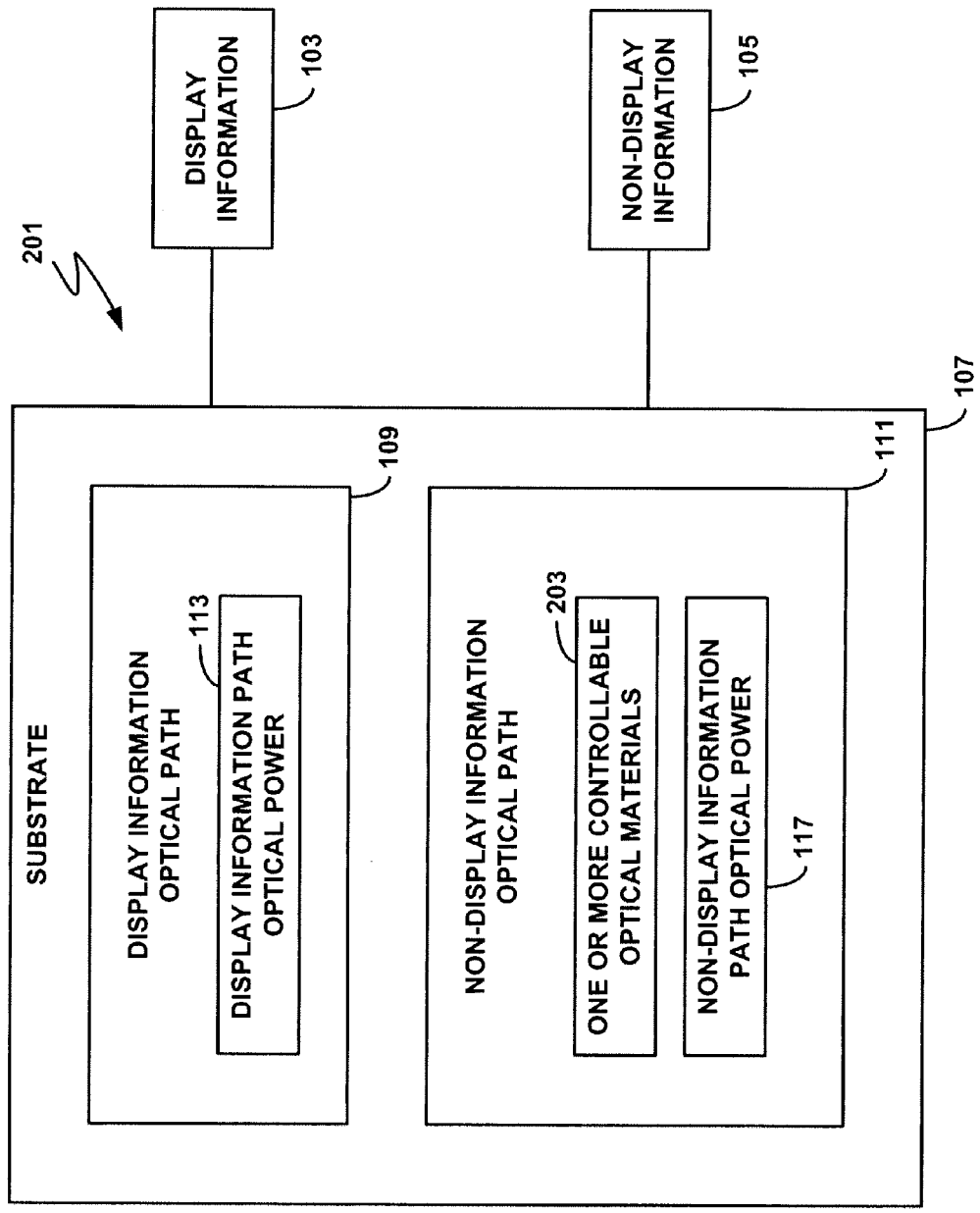
FIG. 2A is a block diagram of an example apparatus to receive and process the display information and the non-display information in accordance with some embodiments of the present invention.

FIG. 2A shows a block diagram of an apparatus 201 to receive and process the display information 103 and the non-display information 105 in accordance with some embodiments. The apparatus 201 includes the substrate 107 including the display information optical path 109 to receive the display information 103 and including the non-display information optical path 111 to receive the non-display information 105.

The display information optical path 109 includes the display information path optical power 113. The non-display information optical path 111 includes one or more controllable optical materials 203 and the non-display information path optical power 117.

The one or more controllable optical materials 203 include materials having one or more controllable optical properties. In some embodiments, the one or more controllable optical materials 203 include photochromic materials. The controllable optical properties, such as opacity, may be controlled by providing the photochromic material with an electromagnetic signal, such as an optical signal, for example, to increase or decrease the opacity of the photochromic material.

In some embodiments, the one or more controllable optical materials 203 include an electrochromic material. The one or more controllable optical properties, such as opacity, may be controlled by providing the electrochromic material with an electromagnetic signal, such as a radio frequency signal, for example, to increase or decrease the opacity of the electrochromic material.

In operation, the one or more controllable optical materials 203 included in the non-display information optical path 111 block or transmit information in the non-display information optical path 111. When at least one of the one or more controllable optical materials 203 is set to block information in the non-display information optical path 111, substantially only display information 103 in the display information optical path 109 passes through the substrate 107.

Neither the display information path optical power 113 nor the non-display information path optical power 117 is limited to a particular power. In some embodiments, the apparatus 201 includes a combination of optical powers. In some embodiments, the display information path optical power 113 includes substantially zero power and the non-display information path optical power 117 includes substantially zero power. In other embodiments, the display information path optical power 113 includes substantially zero power and the non-display information path optical power 117 includes a normal power. In further embodiments, the display information path optical power 113 includes a close power and the non-display information path optical power 117 includes substantially zero power. In additional embodiments, the display information path optical power 113 includes a close power and the non-display information path optical power 117 includes normal power. In additional embodiments, the non-display information path includes two or more optical powers. For example, some embodiments may use the two or more optical powers for correction of presbyopia or for enabling the eye to properly focus for two or more distances other than the display path.

Figure 2B:
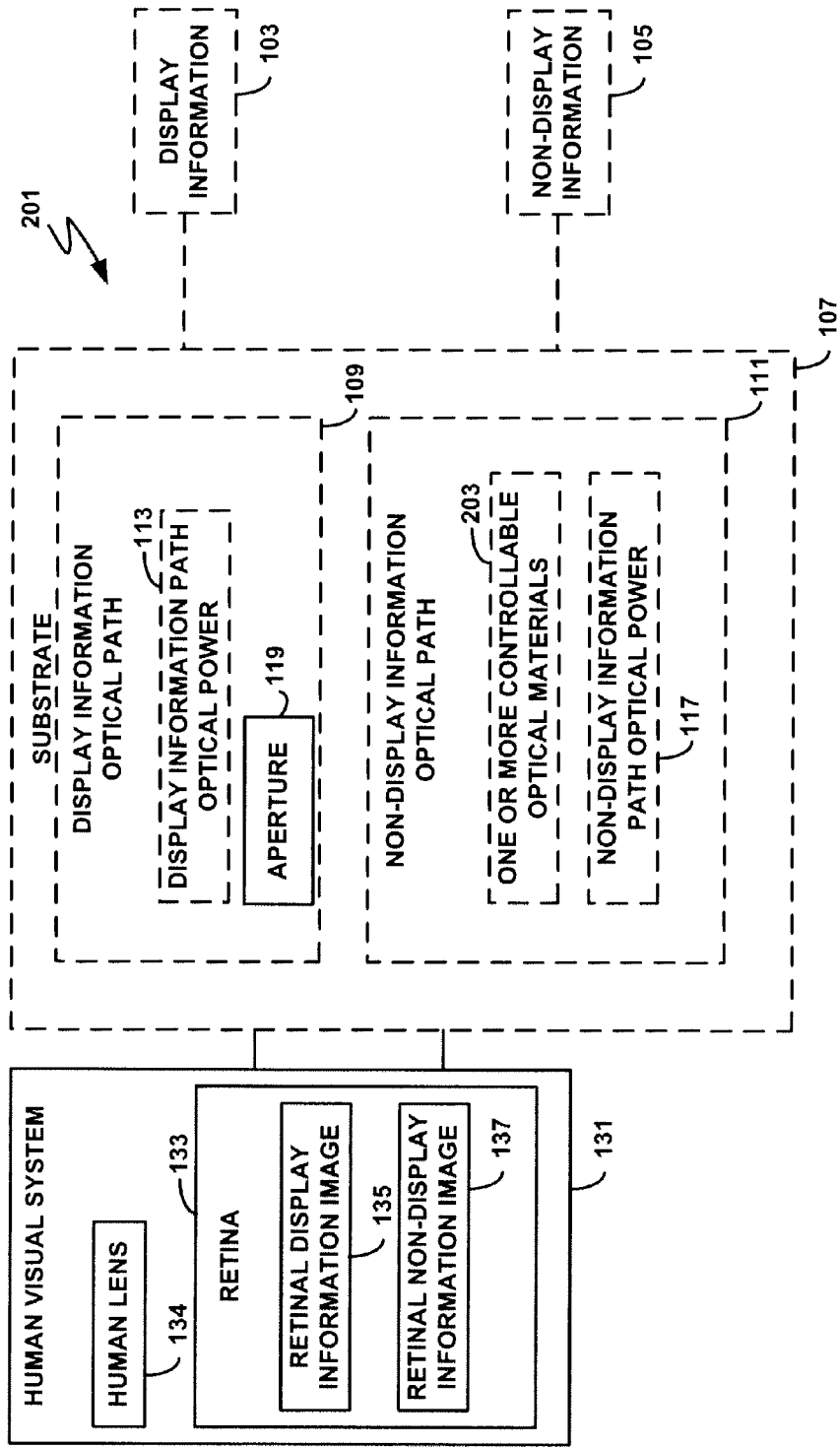
FIG. 2B is a block diagram of the example apparatus (shown in FIG. 2A) coupled to the human visual system (shown in FIG. 1B) in accordance with some embodiments of the present invention.

FIG. 2B shows a block diagram of the apparatus 201 (shown in FIG. 2A) coupled to the human visual system 131 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more controllable optical materials 203 and the non-display information path optical power 117.

In some embodiments, the display information optical path 109 has an aperture 119. The aperture 119 may be sized to assist in focusing the display information 103. In some embodiments, the aperture 119 is sized to increase the depth of focus in the display information optical path 109. In some embodiments, the aperture 119 has a diameter of about one millimeter.

In operation, the display information optical path 109 and the non-display information optical path 111 assist the human visual system 131 in farming a focused image of the display information 103 at the retina 133 and a focused image of the non-display information 105 at the retina 133. The display information optical path 109 in cooperation with the human visual system 131, including the human lens 134, substantially focuses the display information 103 at the retina 133 to form a retinal display information image 135. The non-display information optical path 111 in cooperation with the human visual system 131, including the human lens 134, substantially focuses the non-display information 105 at the retina 133 to form a retinal non-display information image 137. At least one of the one or more controllable optical materials 203 in the non-display information optical path 111 substantially blocks the display information 103 from entering the human visual system 131 from the non-display information optical path 111.

Figure 2C:
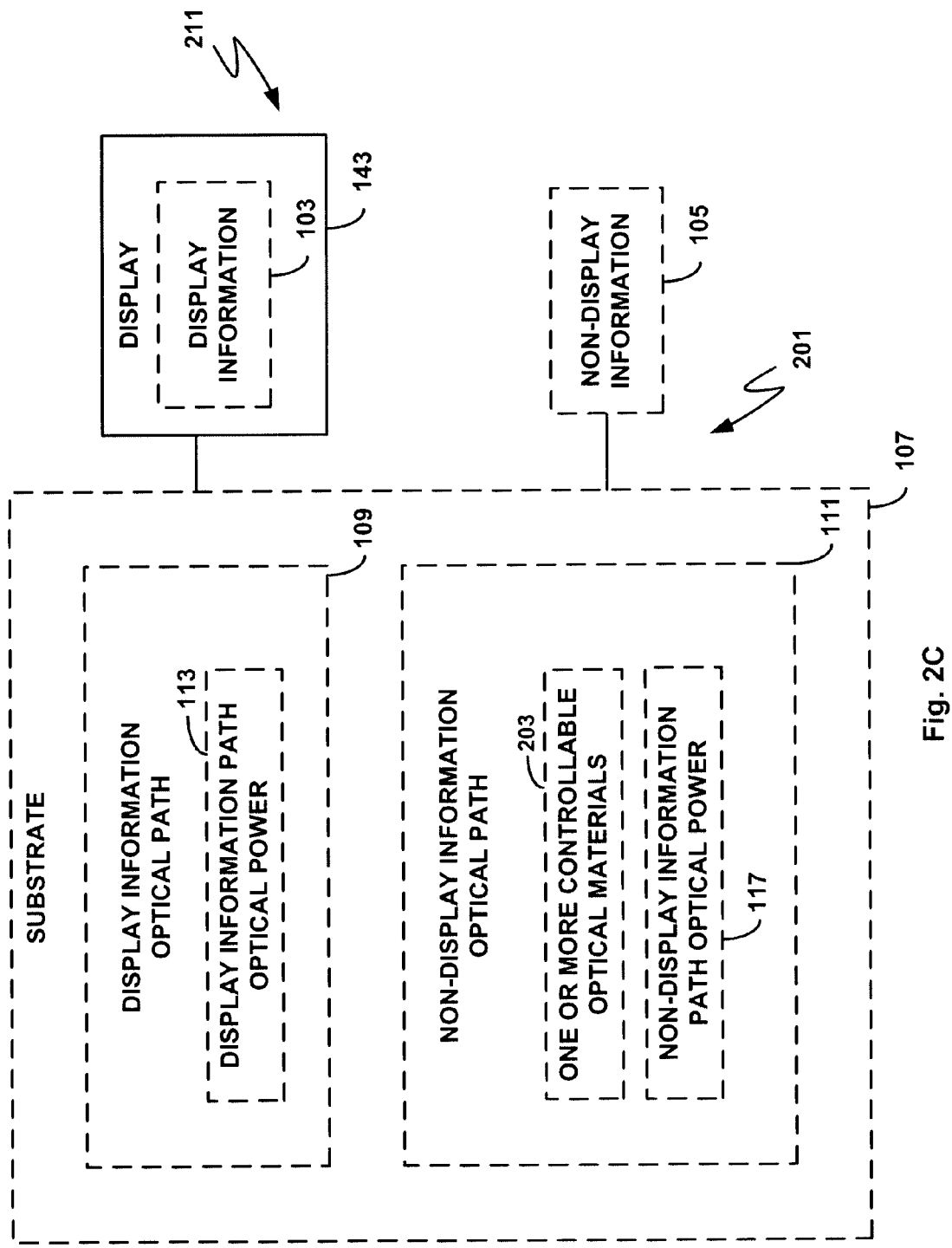
FIG. 2C is a block diagram of an example apparatus including the apparatus (shown in FIG. 2A), and further including the display (shown in FIG. 1C) to provide the display information in accordance with some embodiments.

FIG. 2C shows a block diagram of an apparatus 211 including the apparatus 201 (shown in FIG. 2A), and further including the display 143 (shown in FIG. 1C) to provide the display information 103 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more controllable optical materials 203 and the non-display information path optical power 117. In some embodiments, the display information 103 includes information provided by the display 143.

Figure 2D:
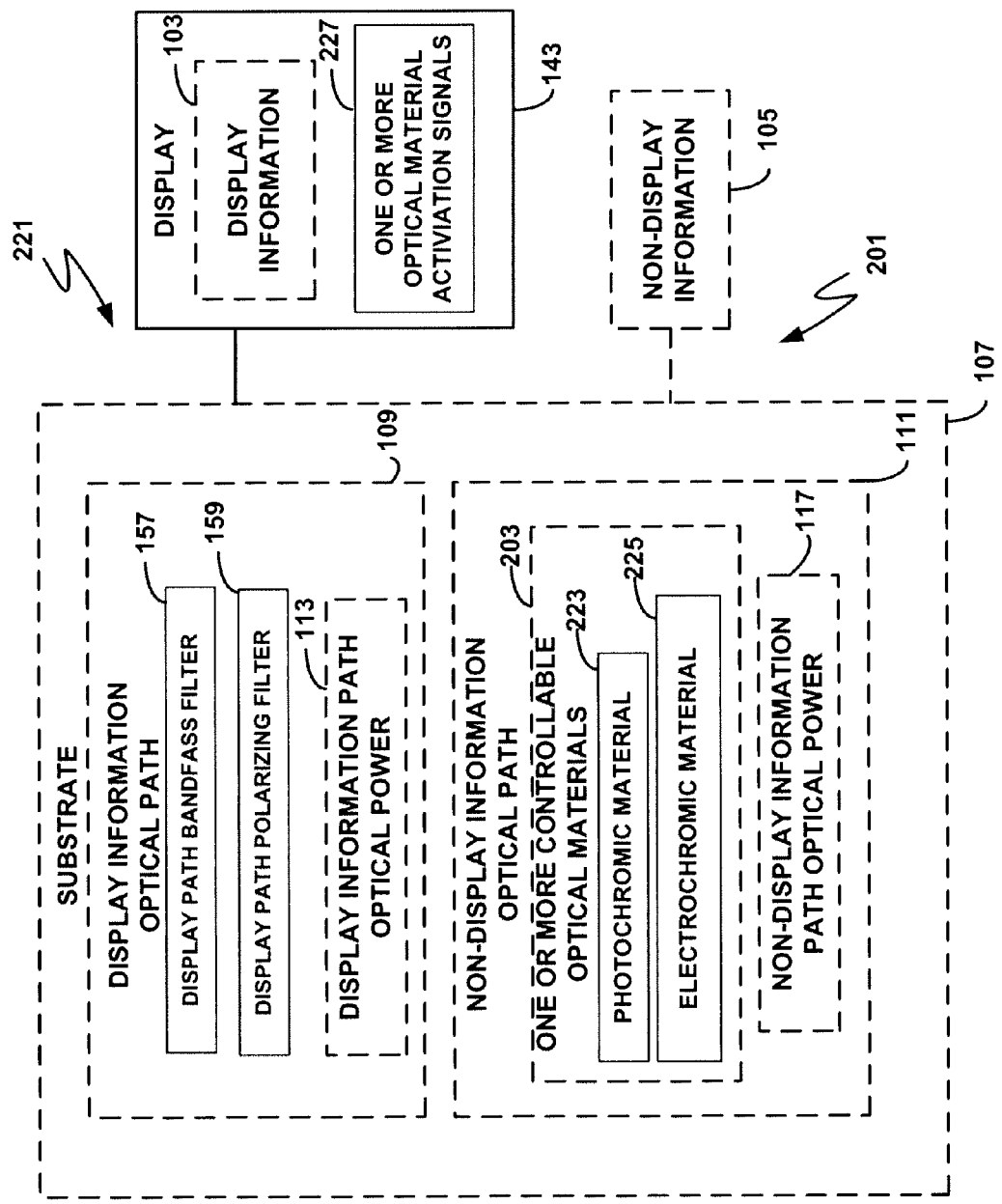
FIG. 2D is a block diagram of an example apparatus including the apparatus (shown in FIG. 2A), wherein at least one of the one or more controllable optical materials includes a photochromic material or an electrochromic material and further including the display (shown in FIG. 1C) to provide the display information and one or more optical material activation signals in accordance with some embodiments of the present invention.

FIG. 2D shows a block diagram of an apparatus 221 including the apparatus 201 (shown in FIG. 2A), wherein at least one of the one or more controllable optical materials 203 includes a photochromic material 223 or an electrochromic material 225 and further including the display 143 to provide the display information 103 and one or more optical material activation signals 227 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one more controllable optical materials 203 and the non-display information path optical power 117. In some embodiments, the display information optical path 109 includes the display path bandpass filter 157. In other embodiments, the display information optical path 109 includes the display path polarizing filter 159.

The one or more material activation signals 227 provide control information to the one or more controllable optical materials 203. In some embodiments, the one or more material activation signals 227 provide control information to the photochromic material 223. An optical signal is an exemplary signal suitable for use in providing control information to the photochromic material 223. In some embodiments, the one or more material activation signals 227 provide control information to the electrochromic material 225. A radio frequency signal is an exemplary signal suitable for use in providing control information to the electrochromic material 225. In some embodiments, the one or more material activation signals 227 are provided by the display 143.

In operation, one or more of the photochromic material 223 and the electrochromic material 225 are included in the non-display information optical path 111 to block or transmit information in the non-display information optical path 111. When at least one of the one or more of the photochromic material 223 and the electrochromic material 225 is set to block information in the non-display information optical path 111, substantially only display information 103 in the display information optical path 109 passes through the substrate 107.

Figure 3:
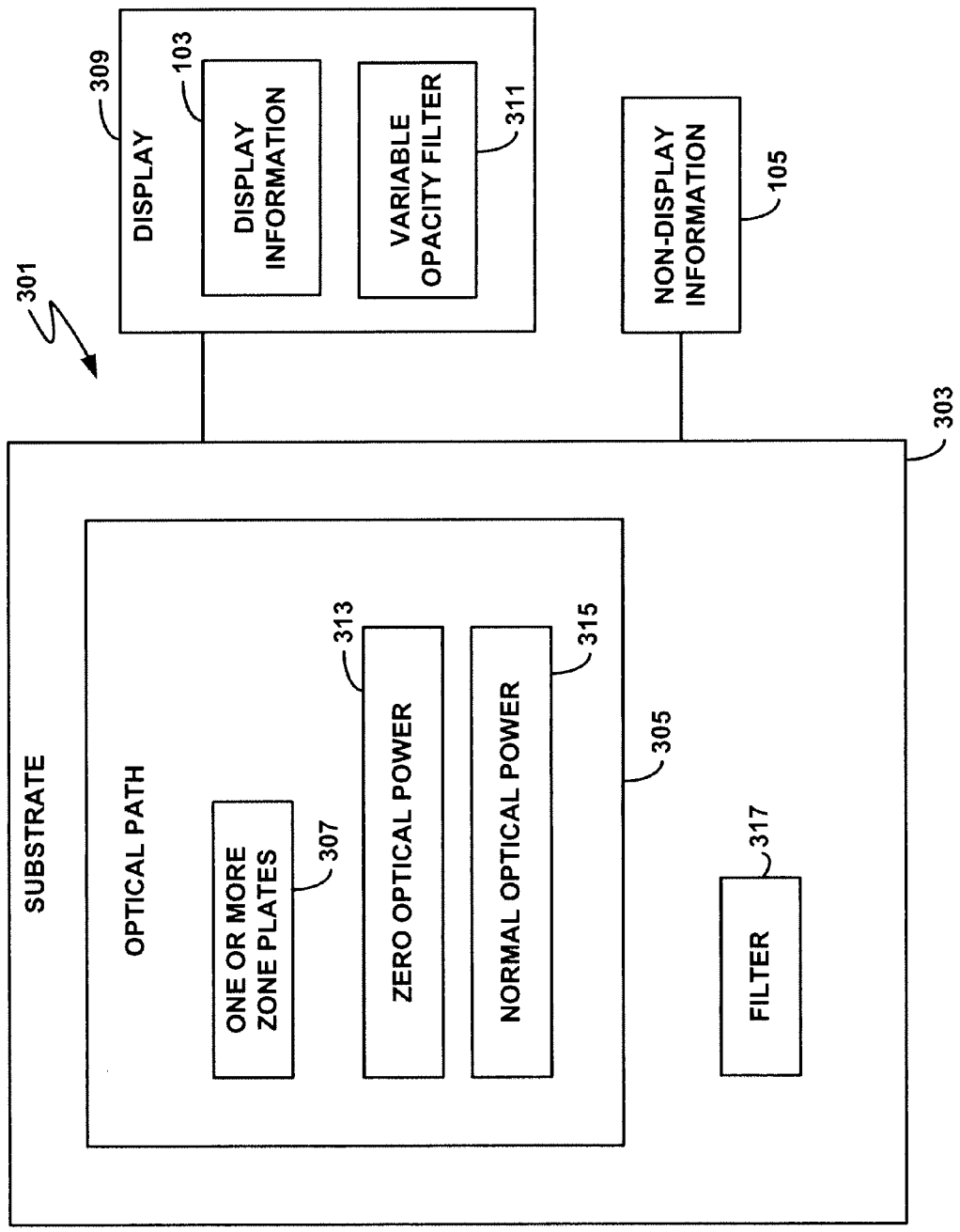
FIG. 3 is an example apparatus comprising a substrate including an optical path having one or more zone plates to receive display information and non-display information in accordance with some embodiments of the present invention.

FIG. 3 shows an apparatus 301 comprising a substrate 303 including an optical path 305 having one or more zone plates 307 to receive the display information 103 and the non-display information 105 in accordance with some embodiments.

The substrate 303 is not limited to being formed from a particular material or combination of materials. Any materials suitable for use in forming optical components, such as lenses, may be used in forming the substrate 303. Exemplary materials suitable for use in forming the substrate 303 include gels such as silicone hydrogels, glasses, plastics, and polymers such as polymethyl, methacrylate and polymacon. The substrate 303 is not limited to a particular type of optical component. In some embodiments, the substrate 303 includes a lens, such as a contact lens, formed from one or more of the exemplary materials.

The formation of the one or more zone plates 307 is not limited to a particular process or set of processes. In some embodiments, each of the one or more zone plates 307 is formed by patterning an interference filter, such as a rugate filter, in concentric rings in one of the one or more zone plates 307. The patterning of a rugate filter is not limited to a particular type of patterning. In some embodiments, the patterning includes binary patterning. In other embodiments, the patterning includes sinusoidal patterning. The refractive index of the rugate filter may vary continuously and periodically.

The one or more zone plates 307, in some embodiments, include three zone plates stacked substantially one on top of the other in the optical path 305 included in the substrate 303. In some embodiments, a display that provides the display information 103 includes the primary colors red, green, and blue and the one or more zone plates 307 are selected to filter the primary colors. To filter the colors red, green, and blue, one of the one or more zone plates 307 may include a rugate filter formed to filter the color red. A second of the one or more zone plates 307 may include a rugate filter formed to filter the color green, while a third of the one or more zone plates 307 may include a rugate filter formed to filter the color blue. The rugate filter formed to filter the color red includes rings that block red and rings that pass all other colors. The rugate filter formed to filter the color green includes rings that block green and rings that pass all other colors, whereas the rugate filter formed to filter the color blue includes rings that block blue and rings that pass all other colors.

In some embodiments, the display information 103 is substantially collimated by the one or more zone plates 307. To collimate the display information 103, the one or more zone plates 307 are formed to have a focal length of between about five and about two hundred millimeters.

In operation, the apparatus 301 processes the display information 103 and the non-display information 105 substantially simultaneously. The display information 103 is diffracted and substantially focused as the display information 103 passes through the optical path 305. The non-display information 105 passes through the optical path 305 substantially unchanged. The display information 103 and the non-display information 105 are focused to substantially the same focal point at substantially the same time. For a focal point located at a retina of a human visual system, the brain superimposes the two images.

The apparatus 301, in some embodiments, includes a display 309. In some embodiments, the display 309 provides display information 103 including display electromagnetic radiation having at least one characteristic feature. The non-display information 105 includes non-display electromagnetic radiation lacking the at least one characteristic feature. In some embodiments, the display 309 provides the display information 103 including display electromagnetic radiation having a narrow spectral bandwidth. The non-display information 105 includes non-display electromagnetic radiation having a broad spectral bandwidth. In some embodiments, the display 309 provides the display information 103 including display electromagnetic radiation having a display information polarization. The non-display information 105 includes non-display electromagnetic radiation having a non-display information polarization different from the display information polarization.

The optical path 305 is not limited to a particular optical power. In some embodiments, the optical path 305 provides substantially zero optical power 313 for the non-display information 103. In some embodiments, the optical path 305 provides a normal optical power 315 for the non-display information 105. In additional embodiments, the non-display information path includes two or more optical powers. For example, some embodiments may use the two or more optical powers for correction of presbyopia or for enabling the eye to properly focus for two or more distances other than the display path.

In some embodiments, the apparatus 301 includes a filter 317 substantially surrounding around the optical path 305. In some embodiments, when the apparatus 301 is used in combination with a human visual system, the filter 317 includes a substantially opaque filter to substantially block the display information 103 outside the optical path 305 from entering the human visual system. In some embodiments, when the apparatus 301 is used in combination with a human visual system, the filter 317 includes a non-display path polarizing filter to substantially block the display information 103 outside the optical path 305 from entering the human visual system. In some embodiments, when the apparatus 301 is used in combination with a human visual system, the filter 317 includes a notch filter to substantially block the display information 103 outside the optical path 305 from entering the human visual system.

Figures 4A, 4B:
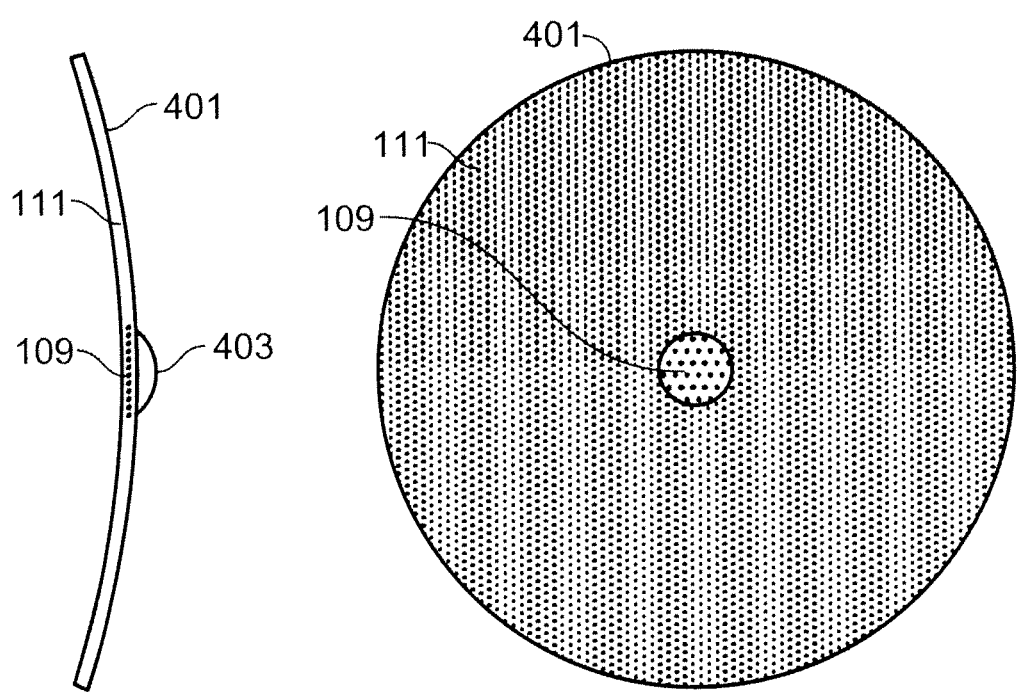
FIGS. 4A and 4B (diametrical section of contact lens shown in 4A) are illustrations of an example contact lens including the display information optical path and the non-display information optical path in accordance with some embodiments of the present invention.

FIGS. 4A and 4B (diametrical section of contact lens 401 shown in 4A) show illustrations of a contact lens 401 including the display information optical path 109 and the non-display information optical path 111 in accordance with some embodiments. The display information optical path 109 forms a substantially cylindrical path through a central area of the contact lens 401. The diameter of the display information optical path 109 may be sized to increase the depth of focus and thereby assist in focusing light from a display, such as a head-mounted display, to a retina in a wearer's visual system. In some embodiments, the display information optical path 109 includes a focusing element 403, such as a lens, to assist the wearer's visual system in focusing light rays to the retina. In some embodiments, the display information optical path 109 includes a wavelength selective filter, a polarization selective filter, or a variable opacity filter including one or more controllable optical materials such as electrochromic or photochromic materials.

The non-display information optical path 111 forms a substantially annular ring surrounding the display information optical path 109. The non-display information optical path 111 may also include a non-display information path optical power to assist the wearer's visual system in focusing light rays from objects located at a greater distance from the wearer's visual system than the display. The non-display information path optical power assists the wearer's visual system by providing an appropriate power to correct for deficiencies in the wearer's visual system. For example, for a nearsighted wearer, the non-display information optical path 111 may include an optical power to correct for the wearer's nearsightedness and permit the nearsighted wearer to clearly view objects more distant from the wearer's visual system than the display. In some embodiments, the non-display information optical path 111 includes (i) a wavelength selective filter (including a wavelength selectivity different from the selectivity of the wavelength selective filter of the display information optical path 109), (ii) a polarization selective filter (including a polarization selectivity different from the polarization selectivity of the polarization selective filter of the display information optical path 109), or (iii) a variable opacity filter.

In operation, the contact lens 401 substantially conforms to the shape of a wearer's cornea. The display information optical path 109 receives and passes or transmits light rays from the display to the wearer. The non-display information optical path 111 receives and passes or transmits light rays from objects more distant from the wearer's visual system than the display.

Figure 5:
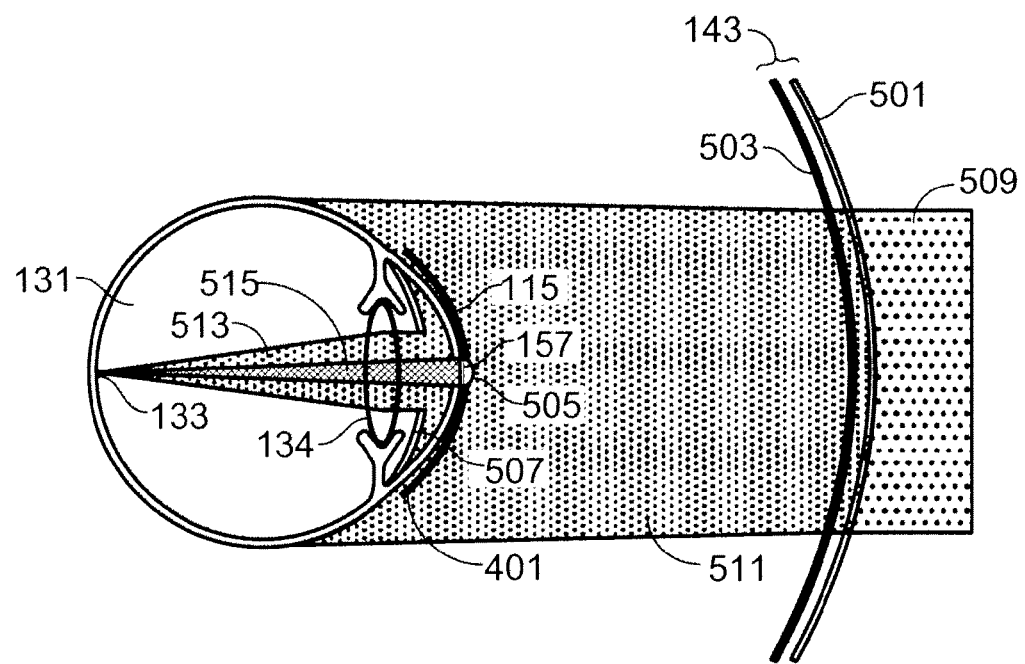
FIG. 5 is an illustration of an example display optically coupled by the contact lens to the human visual system to illustrate processing non-display information using wavelength filters in accordance with some embodiments of the present invention.

FIG. 5 shows an illustration of the display 143 optically coupled by the contact lens 401 to the human visual system 131 to illustrate processing non-display information using wavelength filters in accordance with some embodiments. In the illustrated embodiment, the display 143 includes a display notch filter 501 and an organic light emitting diode display 503. In some embodiments, the contact lens 401 includes (i) display path bandpass filter 157, such as a narrow band bandpass filter, (ii) focusing element 505 to provide display information path optical power, and (iii) one or more filters 115, such as one or more notch filters. The human visual system 131 includes an iris 507, the human lens 134, and the retina 133.

In operation, the light rays 509 received from objects more distant from the contact lens 401 than the display 143 encounter the display 143, the contact lens 401, and the human visual system 131. At the display 143, the display notch filter 501 filters the light rays 509. The wavelengths of the light rays 509 that correspond to the wavelength notches of display notch filter 501 are substantially removed by the display notch filter 501, allowing light rays 511 to pass. The light rays 511 pass through the display 143 substantially unaltered. At the contact lens 401, the light rays 511 are substantially blocked by the display path bandpass filter 157 and substantially passed by the one or more filters 115. At the human visual system 131, one or more of the light rays 511 pass through the iris 507 to form light rays 513. The human lens 134 focuses the light rays 513 to the retina 133.

Shadow 515 is created by the light rays blocked by the display path bandpass filter 157. The display path bandpass filter 157 slightly reduces the image intensity at the retina 133 when compared to an image formed at the retina 133 in the absence of the display path bandpass filter 157. Otherwise, the image at the retina 133 is substantially unaltered by the display path bandpass filter 157. The focusing element 505 has substantially no effect on the light rays 513 reaching the retina 133, as the light rays 511 received at the focusing element 505 are blocked by the display path bandpass filter 157.

In the absence of the display 143, a wearer of the contact lens 401 sees a normal, real world environment except that the light rays 511 now include the wavelengths substantially blocked by the display notch filter 501 when the display 143 is in use. At the contact lens 401, the wavelengths blocked at the display notch filter 501 when the display 143 is in use are passed by the display path bandpass filter 157 and defocused by the focusing element 505.

Figure 6:
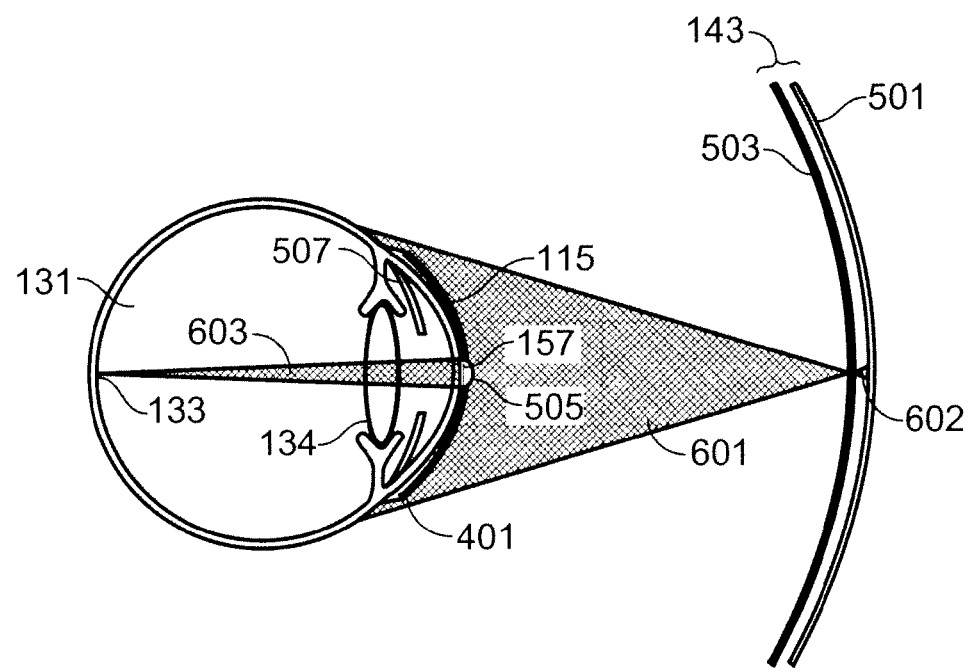
FIG. 6 is an illustration of an example display optically coupled by the contact lens to the human visual system to illustrate processing display information using wavelength filters in accordance with some embodiments of the present invention.

FIG. 6 shows an illustration of the display 143 optically coupled by the contact lens 401 to the human visual system 131 to illustrate processing display information using wavelength filters in accordance with some embodiments. The display 143 includes the display notch filter 501 and the organic light emitting diode display 503. The contact lens 401 includes (i) the display path bandpass filter 157, such as a narrow bandwidth bandpass filter, (ii) the focusing element 505 to provide display information path optical power, and (iii) the one or more filters 115. The human visual system 131 includes the iris 507, the human lens 134, and the retina 133.

In operation, light rays 601 and 602 are provided by the organic light emitting diode display 503. The light rays 602 are blocked by the display notch filter 501. Thus, the light rays 602 are not visible to a viewer looking at a wearer of the contact lens 401. The light rays 601 are received at the contact lens 401 and the human visual system 131. The light rays 601 are blocked by the one or more filters 115, for example, a notch filter, but are passed as light rays 603 by the display path bandpass filter 157. The focusing element 505, such as a focusing lens, provides optical power to assist the human lens 134 to focus the light rays 603 to the retina 133. The light rays 603 are substantially unaffected by the iris 507.

In some embodiments, the display 143 is occluded or partially occluded. In such embodiments, a material having an opacity is included in the display 143 to provide the occlusion or partial occlusion. When the material is included in the display 143 on the side of display 143 facing away from the contact lens 401, some or all of the non-display information or ambient light rays are blocked. In such embodiments, the display notch filter 501 is not required.

Figure 7:
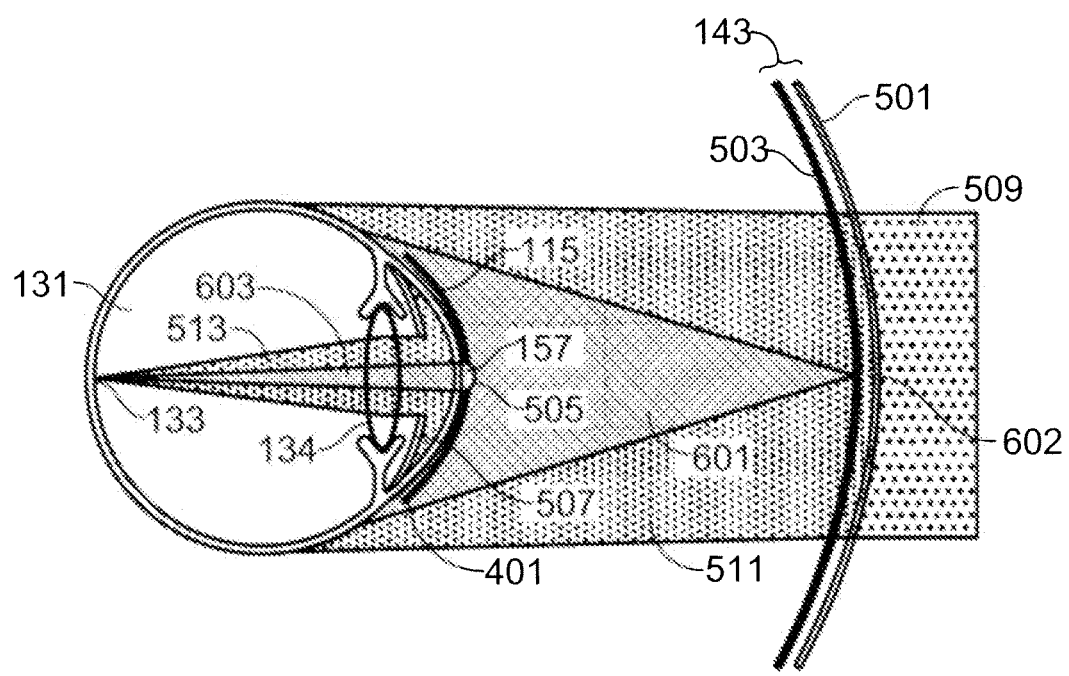
FIG. 7 is an illustration of an example display optically coupled by the contact lens to the human visual system to illustrate processing to combine non-display information and display information using wavelength filters in accordance with some embodiments of the present invention.

FIG. 7 shows an illustration of the display 143 optically coupled by the contact lens 401 to the human visual system 131 to illustrate processing to combine non-display information and display information using wavelength filters in accordance with some embodiments. The display 143 includes the display notch filter 501 and the organic light emitting diode display 503. The contact lens 401 includes the display path bandpass filter 157, the focusing element 505 to provide display information path optical power, and the one or more filters 115. The human visual system 131 includes the iris 507, the human lens 134, and the retina 133.

In operation, the light rays 509 received from objects more distant from the contact lens 401 than the display 143 are processed as described above in the description of FIG. 5 to provide light rays 511 and 513. The light rays 601 and 602 provided by the display 143 are processed as described above in the description of FIG. 6 to provide light rays 603. The light rays 603 come to a focus at substantially the same spot on the retina 133 as the light rays 513. The wearer's brain combines the retinal images provided by the light rays 603 and the light rays 509 to form a superimposed image.

Figure 8:
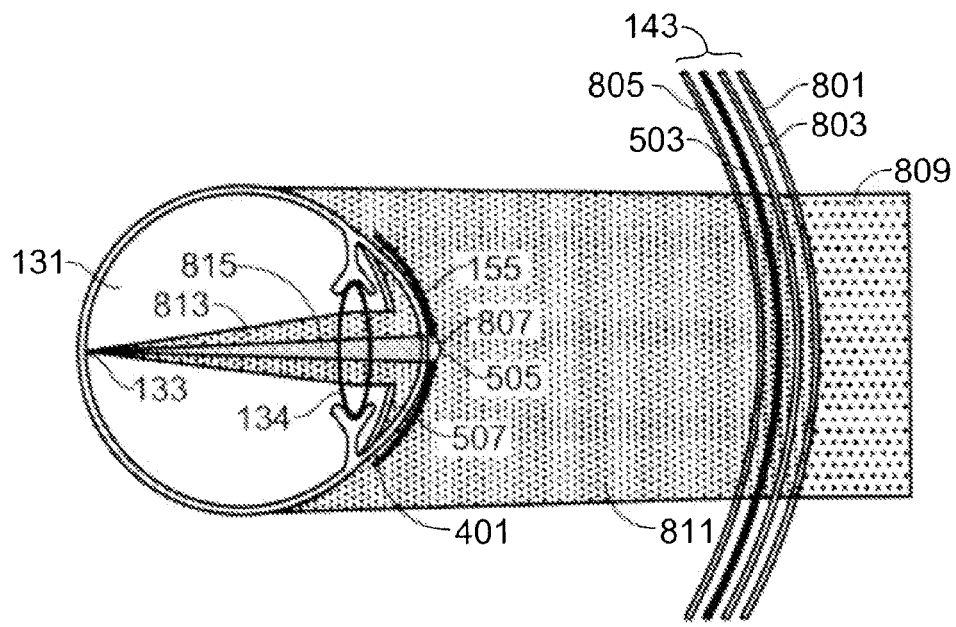
FIG. 8 is an illustration of an example display optically coupled by the contact lens to the human visual system to illustrate processing non-display information using polarizing filters in accordance with some embodiments of the present invention.

FIG. 8 shows an illustration of the display 143 optically coupled by the contact lens 401 to the human visual system 131 to illustrate processing non-display information using polarizing filters in accordance with some embodiments. The display 143 includes the organic light emitting diode display 503, a display polarizing filter 801, and display shutters 803 and 805. The contact lens 401 includes a display path filter 807, such as a display path bandpass filter or a display path polarizing filter, the focusing element 505 to provide display information path optical power, and the non-display path polarizing filter 155. The human visual system 131 includes the iris 507, the human lens 134, and the retina 133.

In operation, the light rays 809 are polarized by the display polarizing filter 801 to form light rays 811. The shutters 803 and 805 are switched to the same polarization as the display polarizing filter 801. Thus, the light rays 811 pass through the shutters 803 and 805 substantially unaltered. The organic light emitting diode display 503 is set to an "off" state and is therefore substantially translucent to the light rays 811. Thus, the light rays 811 also pass through the organic light emitting diode display 503 substantially unaltered. The light rays 811 are substantially blocked by the display path filter 807. In some embodiments, the display path filter 807 includes the display path bandpass filter 157 (shown in FIG. 1D). In some embodiments, the display path filter 807 includes the display path polarizing filter 159 (shown in FIG. 1D) having a polarization different from the polarization of the shutters 803 and 805. The non-display path polarizing filter 155 has the same polarization as the shutters 803 and 805. Thus, the light rays 811 pass through the non-display path polarizing filter 155 substantially unaltered. At the human visual system 131, the iris 507 limits the light rays passing through the iris 507 to light rays 813. The human lens 134 focuses the light rays 813 at the retina 133.

Shadow 815 is created by the light rays blocked by the display path filter 807. The display path filter 807 slightly reduces the image intensity at the retina 133 when compared to an image formed at the retina 133 in the absence of the display path filter 807. Otherwise, the image at the retina 133 is substantially unaltered by the display path filter 807. The focusing element 505 has substantially no effect on the light rays 811 reaching the retina 133, as the light rays 811 passing through the focusing element 505 are substantially blocked by the display path filter 807.

In the absence of the display 143, a wearer of the contact lens 401 sees a normal, real world environment except that the light rays 811 are polarized. For the display path filter 807 including either a polarizing filter or a bandpass filter, the light rays passing through the display path filter 807 are defocused by the focusing element 505 before reaching retina 133.

Figure 9:
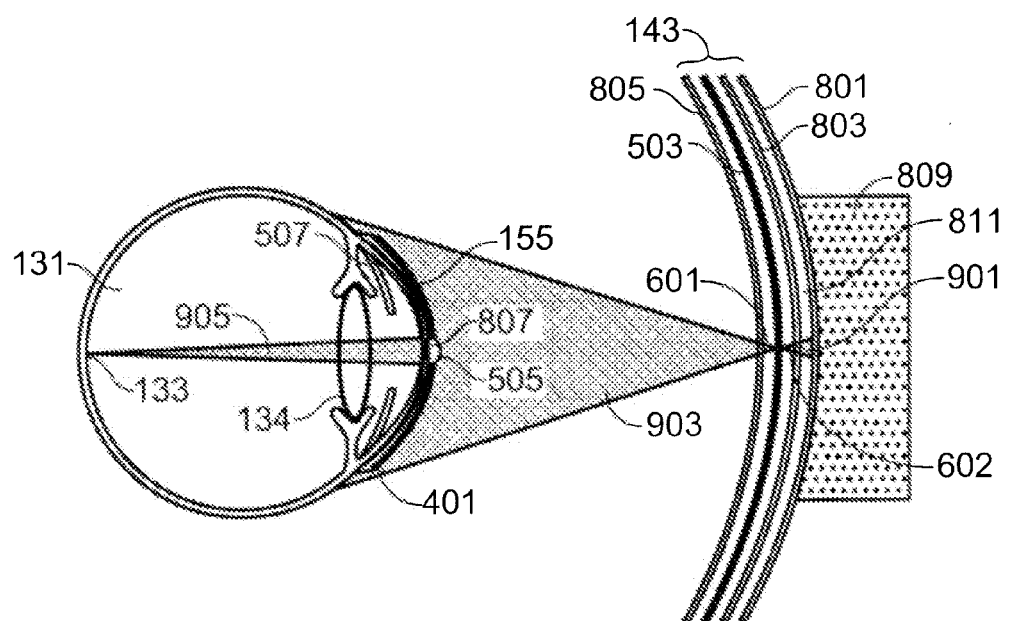
FIG. 9 is an illustration of an example display optically coupled by the contact lens to the human visual system to illustrate processing display information using polarizing filters in accordance with some embodiments of the present invention.

FIG. 9 shows an illustration of the display 143 optically coupled by the contact lens 401 to the human visual system 131 to illustrate processing display information using polarizing filters in accordance with some embodiments. The display 143 includes the display polarizing filter 801, the display shutter 803, the organic light emitting diode display 503, and the display shutter 805. The contact lens 401 includes the non-display path polarizing filter 155, the display path filter 807, such as a display path bandpass filter or a display path polarizing filter, and the focusing element 505 to provide display information path optical power. The human visual system 131 includes the iris 507, the human lens 134, and the retina. 133.

In operation, the display polarizing filter 801 polarizes the light rays 809 to form light rays 811. The shutter 803 is switched to a polarization to substantially block the light rays 811, and the organic light emitting diode display 503 is set to an "on" state. The organic light emitting diode display 503 provides the light rays 601 and 602, while the shutter 803 polarizes the light rays 602 to form light rays 901. The display polarizing filter 801 is set to a polarization to substantially block the light rays 901. Thus, the light rays 901 are not visible to a viewer looking at a wearer of the display 143. The shutter 805 polarizes the light rays 601 to form light rays 903. The non-display path polarizing filter 155 is set to a polarization to substantially block the light rays 903. For the display path filter 807 set to substantially the same polarization as the shutter 805, the display path filter 807 passes the light rays 903 substantially unaltered. The focusing element 505, such as a focusing lens, provides optical power to assist the human lens 134 to focus the light rays 905 to the retina 133. Thus, the focusing element 505 may provide an optical power to assist the human lens 134 in focusing the light rays 903 at the retina 133. The human lens 134 in combination with the focusing element 505 processes the light rays 903 to form light rays 905. The iris 507 has substantially no effect on the light rays 905 substantially focused at the retina 133.

If the display 143 is occluded or partially occluded, the display polarization filter 801 is not required. Instead, in some embodiments, a material having an opacity is included on the side of the display 143 facing away from the contact lens 401 to block some or all of the light rays 509 including the non-display information.

In some embodiments, a quarter wave-plate is included in the shutter 805 to convert the light rays 601 having a linear polarization to a circular polarization. To support the processing of circularly polarized radiation, the non-display path polarizing filter 155 includes a filter to provide transmission of right-handed circularly polarized radiation. Also, to support the processing of circularly polarized radiation, the display path filter 807 includes a filter to provide transmission of left-handed circularly polarized radiation. In operation, to process the non-display information, the shutter 805 including the quarter wave-plate is set to pass right-handed circularly polarized radiation. In operation, to process the display information the shutter 805 including the quarter wave plate is set to pass left-handed circularly polarized radiation. In some embodiments, the display path filter 807 includes a display path bandpass filter.

A filter providing transmission of circularly polarized radiation, unlike a filter providing for transmission of linearly polarized radiation, does not require rotational alignment of the contact lens 401 with the human visual system 131. However, the non-display path polarizing filter 155 is not limited to a filter for processing circularly polarized radiation. In some embodiments, the non-display path polarizing filter 155 includes a filter to provide transmission of linearly polarized radiation.

Referring to FIG. 8 and FIG. 9, in some embodiments the shutters 803 and 805 are switched between one polarization state and another polarization state in synchronization with the setting of the organic light emitting diode display 503 to an "on" state and an "off" state. For example, when the organic light emitting diode display 503 is set to an "on" state, the shutters 803 and 805 are switched to the state as described for FIG. 9 to process the display information provided by the light rays 601 and 602 from the organic light emitting diode display 503. And, for example, when the organic light emitting diode display 503 is set to an "off" state, the shutters 803 and 805 are switched to the state as described for FIG. 8 to process non-display information provided by the light rays 809. The switching rate is set to a frequency that allows the brain of a wearer of the contact lens 401 to form a single image from the superposition of the images of the display information and the non-display information.

Polarizing shutters, such as shutters 803 and 805, can utilize liquid crystal display panels that re-orient their liquid crystals in response to an applied electric field. When the crystals are oriented in one direction, they pass electromagnetic radiation having a particular polarization. Changing the electric field to orient the crystals in a second direction causes electromagnetic radiation having a second polarization to be passed.

Figures 10A, 10B:
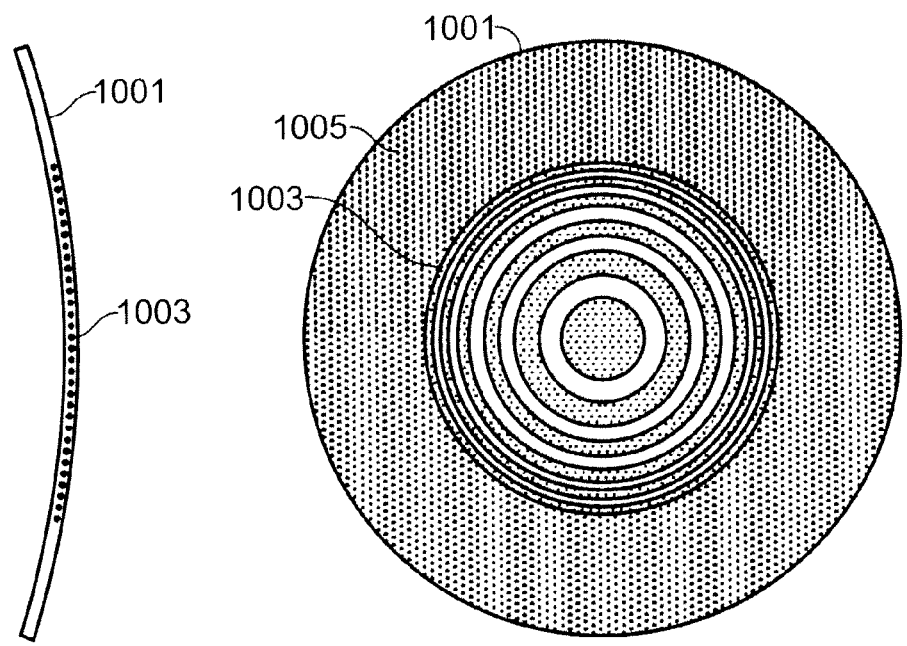
FIGS. 10A and 10B (diametrical section of illustration shown in 10A) are illustrations of an example contact lens including one or more zone plate filters in accordance with some embodiments of the present invention.

FIGS. 10A and 10B (diametrical section of illustration shown in FIG. 10A) show illustrations of a contact lens 1001 including one or more zone plate filters 1003 in accordance with some embodiments. In certain embodiments, the one or more zone plate filters 1003 are formed by patterning a rugate filter in concentric rings of a diffraction zone plate, which focuses light using diffraction to cause constructive interference at a focal point to create an image. A rugate filter includes optical interference films of varying thickness. The refractive index of the optical interference film varies as a function of the film's optical thickness. The use of a rugate filter in forming a zone plate results in a zone plate that operates on a particular set of wavelengths, for example, a narrow band of wavelengths. In some embodiments, the patterning of the zone plate is binary. Binary patterning includes substantially opaque and transparent rings of substantially equal areas. In some embodiments, the patterning is sinusoid. Sinusoid patterning includes rings having substantially gradual variations in opacity. In some embodiments, the contact lens 1001 includes a notch filter 1005 forming substantially an annular ring around the one or more zone plate filters 1003.

Figure 11:
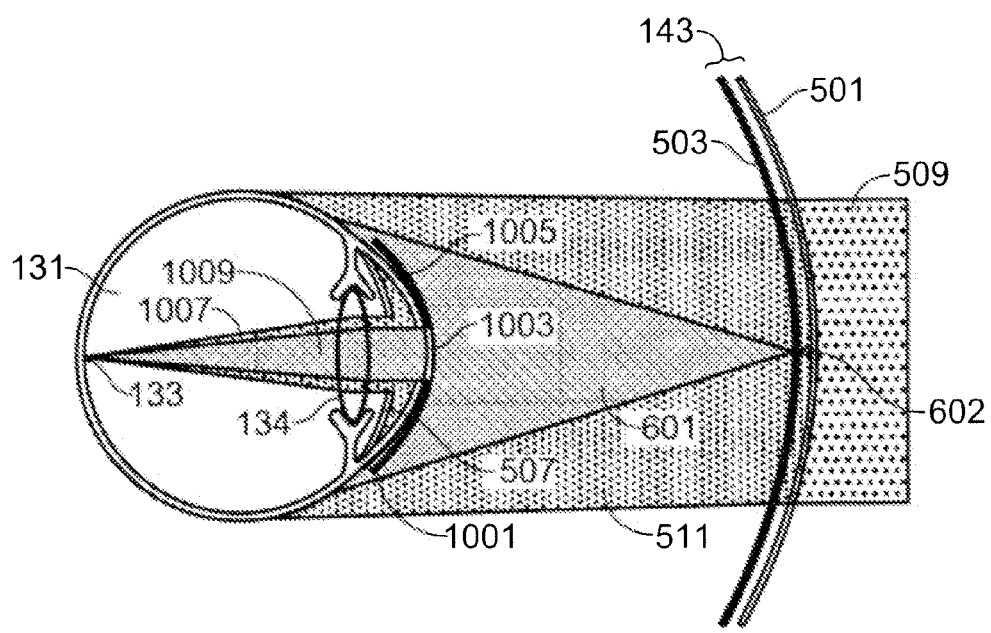
FIG. 11 is an illustration of an example display optically coupled by the contact lens to the human visual system to illustrate processing display information and non-display information using the one or more zone plate filters in accordance with some embodiments of the present invention.

FIG. 11 shows an illustration of the display 143 optically coupled by the contact lens 1001 to the human visual system 131 to illustrate processing display information and non-display information using the one or more zone plate filters 1003 in accordance with some embodiments. The display 143 includes the display notch filter 501 and the organic light emitting diode display 503. The contact lens 1001 includes the one or more zone plate filters 1003. In some embodiments, the contact lens 1001 includes the notch filter 1005. The human visual system 131 includes the iris 507, the human lens 134, and the retina 133.

In operation, the light rays 509 providing non-display information received from objects more distant from the contact lens 1001 than the display 143 encounter the display 143, the contact lens 1001, and the human visual system 131. At the display 143, the display notch filter 501 filters the light rays 509. The wavelengths of the light rays 509 that correspond to the wavelength notches of the display notch filter 501 are substantially removed by the display notch filter 501, passing the light rays 511. The light rays 511 pass through the display 143 substantially unaltered. At the contact lens 1001, the light rays 511 pass through the one or more zone plate filters 1003 and the notch filter 1005 substantially unaltered. At the human visual system 131, the iris 507 may block some of the light rays 511, passing light rays 1007. The human lens 134 focuses the light rays 1007 including the non-display information at the retina 133.

In operation, the organic light emitting diode display 503 provides light rays 601 and 602. The light rays 602 are directed away from the contact lens 1001 and are substantially blocked by the display notch filter 501. Thus, the light rays 602 are not visible to a viewer looking at a wearer of the display 143. The light rays 601 are directed toward the contact lens 1001 including the notch filter 1005 and the one or more zone plate filters 1003. At the notch filter 1005, the light rays 601 are substantially blocked. At the one or more zone plate filters 1003, the light rays 601 are diffracted to form the light rays 1009. The human lens 134 focuses the light rays 1009 including the display information at the retina 133.

The light rays 509 received from objects more distant from the contact lens 1001 than the display 143 are processed as described above to provide the light rays 1007 including the non-display information to the retina 133. The light rays 601 provided by the display 143 are processed as described above to provide the light rays 1009 including the display information to the retina 133. The light rays 1007 and the light rays 1009 are focused at substantially the same spot at the retina 133 at substantially the same time. Thus, the brain of the wearer of the contact lens 1001 combines the retinal image provided by the light rays 1007 including the non-display information and the retinal image provided by the light rays 1009 including the display information to form a superimposed image including the display information and the non-display information.

In the absence of the display 143, a wearer of the contact lens 1001 sees a normal, real world environment except the light rays 511 now include the wavelengths substantially blocked by the display notch filter 501. At the contact lens 1001, the wavelengths blocked at the display notch filter 501 when the display 143 is present are diffracted by the one or more zone plate filters 1003 and defocused by the human lens 134.

If the display 143 is occluded or partially occluded, the display notch filter 501 is not required. Instead, in some embodiments, a material having an opacity is included on the side of the display 143 facing away from the contact lens 1001 to block some or all of the light rays 509 including the non-display information.

Figure 12:
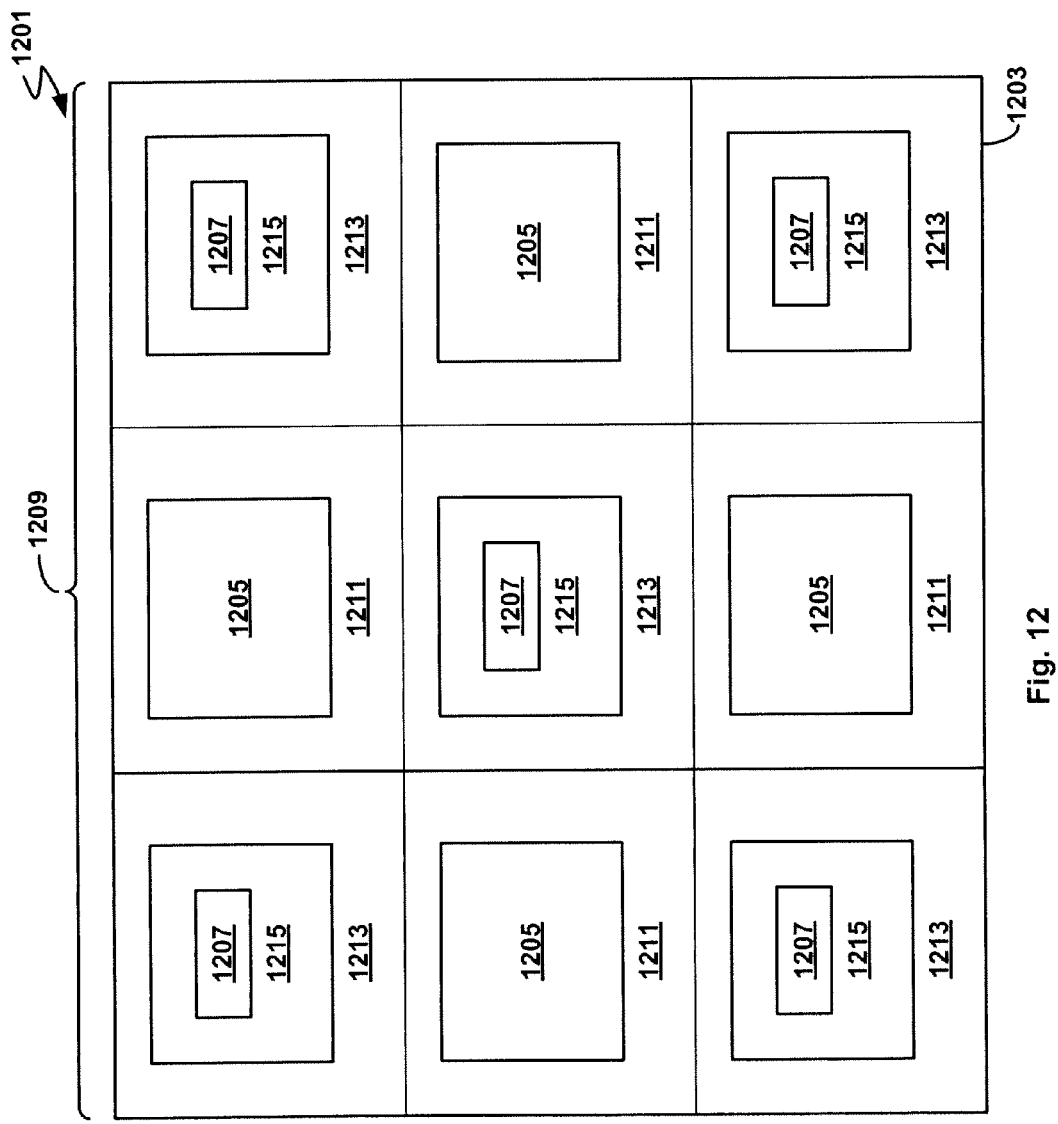
FIG. 12 is an illustration of an example apparatus including a substrate, a substantially transparent pixel unit, and an organic light emitting diode (OLED) unit in accordance with some embodiments of the present invention.

FIG. 12 shows an illustration of an apparatus 1201 including a substrate 1203, a substantially transparent pixel unit 1205, and an organic light emitting diode unit 1207 in accordance with some embodiments. The substrate 1203 includes a pattern 1209 of pixel sites including a first pattern of one or more first pixel sites 1211 and a second pattern of one or more second pixel sites 1213. The substantially transparent pixel unit 1205 is located at substantially each of the one or more first pixel sites 1211. The organic light emitting diode pixel unit 1207 including a filter 1215 is located at substantially each of the one or more second pixel sites 1213. The filter 1215 is located on the substrate 1203 to enable filtering of the electromagnetic radiation emitted by the organic light emitting diode unit before the electromagnetic radiation reaches a viewer. To filter the electromagnetic radiation, such as visible light, emitted by the organic light emitting diode pixel unit 1207, the area of the filter 1215 is substantially equal to or greater than the area of the organic light emitting diode pixel unit 1207. In some embodiments, the filter 1215 is a narrow band filter. In other embodiments, the filter 1215 is a polarizing filter. The pattern 1209 of pixel sites is not limited to a particular pattern. In some embodiments, the pattern 1209 of pixel sites includes a checkerboard pattern including the first pattern of the one or more first pixel sites 1211 alternating with the second pattern of the one or more second pixel sites 1213. The sites are not limited to a particular shape and the shapes shown are only for schematic illustration.

Figure 13:
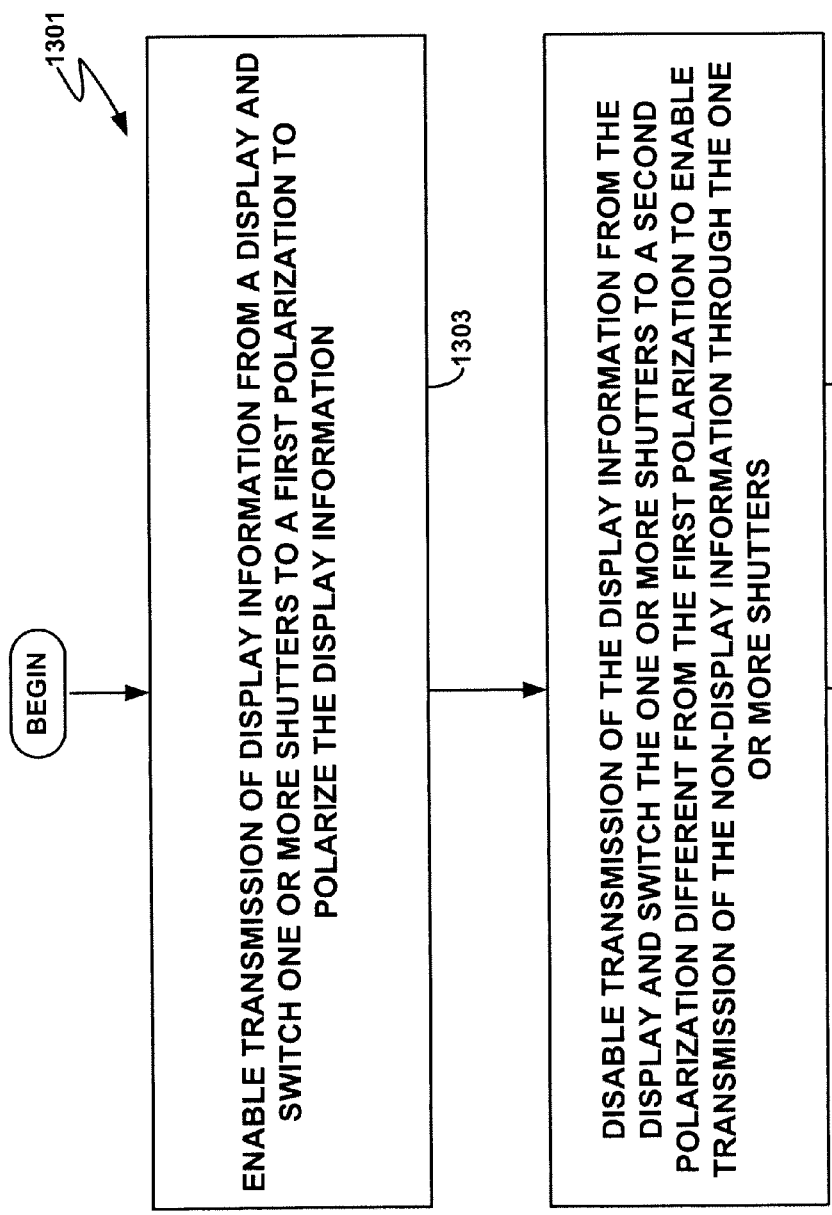
FIG. 13 is a flow diagram of an example method including enabling and disabling transmission of display information and transmission of non-display information in accordance with some embodiments of the present invention.

FIG. 13 shows a flow diagram of a method 1301 including enabling and disabling transmission of display information and transmission of non-display information in accordance with some embodiments. In the illustrated embodiment, the method 1301 enables transmission of display information from a display and switches one or more shutters to a first polarization to polarize the display information (block 1303). The method 1301 also disables transmission of the display information from the display and switches the one or more shutters to a second polarization different from the first polarization to enable transmission of the non-display information through the one or more shutters (block 1305). In some embodiments, the method 1301 includes receiving the display information and the non-display information at a contact lens. In some embodiments, the method 1301 includes substantially blocking the display information at a non-display information optical path included in the contact lens and substantially transmitting the display information at a display information optical path included in the contact lens.

Figure 14:
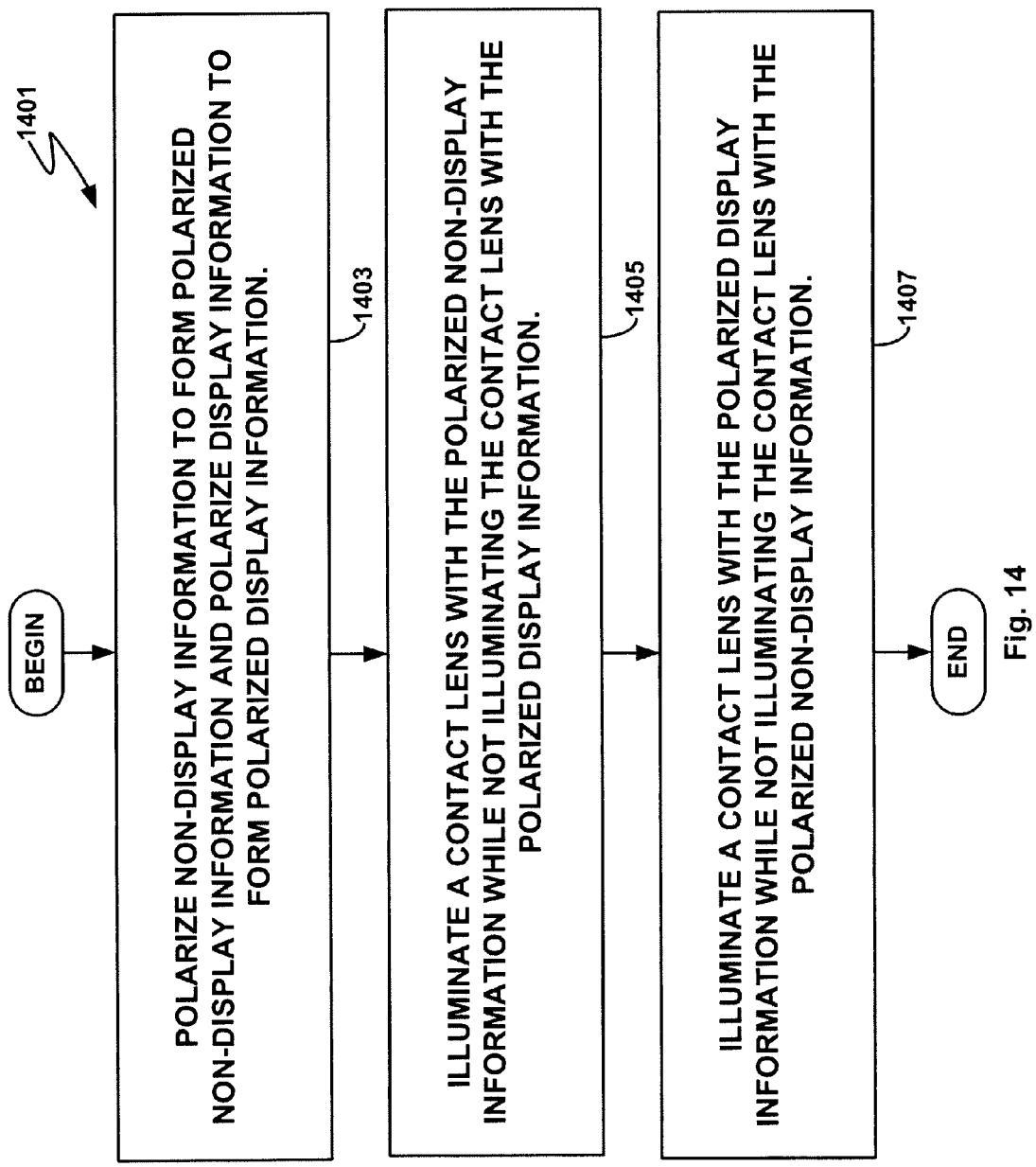
FIG. 14 is a flow diagram of an example method including polarizing display and non-display information and illuminating a contact lens with the polarized display and non-display information in accordance with some embodiments of the present invention.

FIG. 14 shows a flow diagram of a method 1401 including polarizing display and non-display information and illuminating a contact lens with the polarized display and non-display information in accordance with some embodiments. In the illustrated embodiment, the method 1401 (i) polarizes non-display information to form polarized non-display information and polarizes display information to form polarized display information (block 1403), (ii) illuminates a contact lens with the polarized non-display information while not illuminating the contact lens with the polarized display information (block 1405), and (iii) illuminates the contact lens with the polarized display information while not illuminating the contact lens with the polarized non-display information (block 1407). In some embodiments, the method 1401 includes substantially blocking the polarized display information at the non-display information path at the contact lens.

Figure 15A:
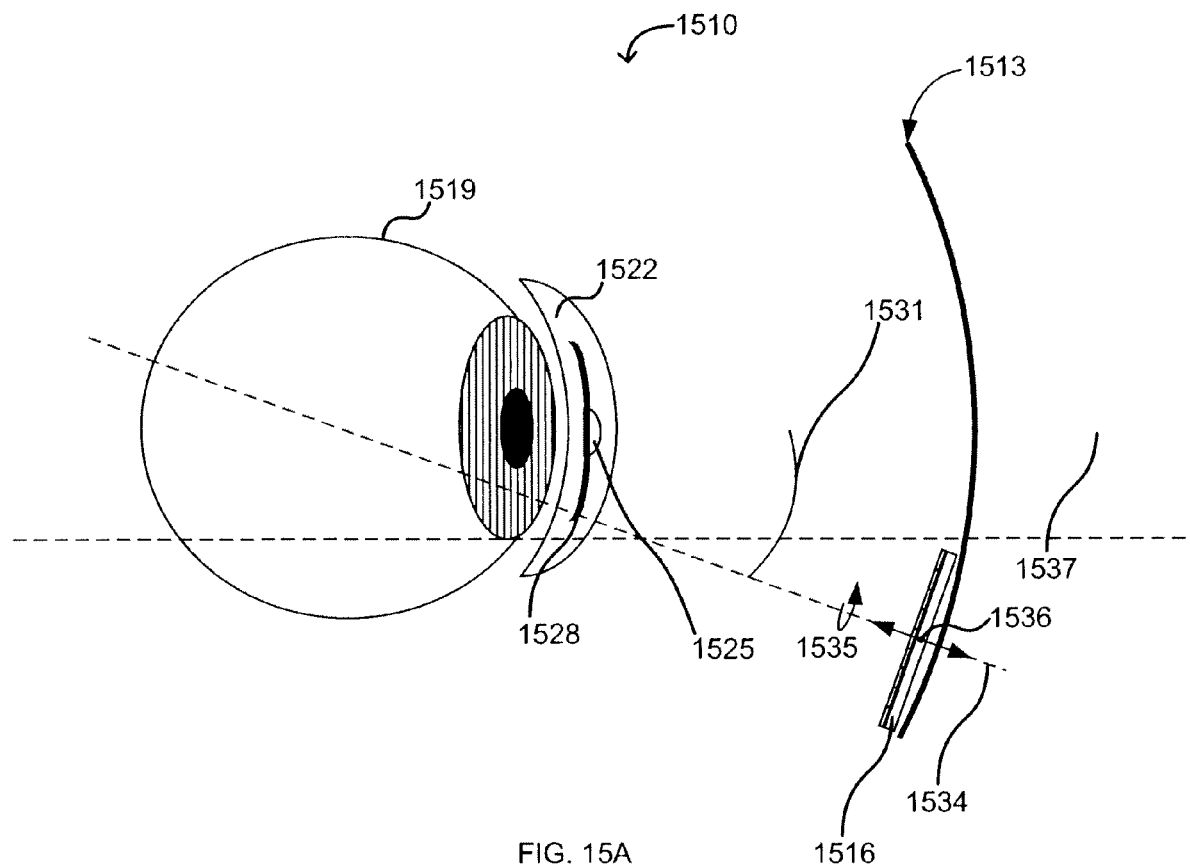
FIG. 15A is an illustration of an example configuration of a display optically disposed on a head-borne apparatus and positioned in close proximity to an eye in accordance with one embodiment of the present invention.

FIG. 15A is an illustration of an example configuration 1510 of a display panel 1516 optically disposed on a head-borne apparatus 1513 and positioned in close proximity to an eye 1519 in accordance with one embodiment of the present invention. The display panel 1516 is disposed such that when the viewer is wearing the head-borne apparatus, the display panel 1516 is positioned in such close proximity to eye 1519 that it is unable to focus on the display panel unassisted. It should be noted that the display panel 1516 as illustrated is explicitly lacking any focusing optics and, thus, allows the light emitted from the display panel's pixels to diverge unfocused.

In order to facilitate focusing of the image shown on the display panel 1516, a contact lens 1522 having focusing optics 1525 assists the eye 1519 in focusing on the display panel 1516. In some embodiments, the focusing optics 1525 is a lenslet having a diopter of 25 or greater. For example, certain embodiments may use a lenslet of 40 or 60 diopters to focus the image displayed by display panel 1516 for eye 1519. The contact lens 1522 may also be equipped with an optical filter 1528 that assists the eye 1519 in imaging the display panel 1516.

In some embodiments, the display panel 1516 is disposed on the head-borne apparatus 1513 such that the display panel is positioned at a vertical angle 1531 with respect to the line of sight 1537 of the human visual system. For example, the display panel 1516 may be positioned between 45 and 135 degrees below the viewer's line of sight 1537. Additionally, the display panel in various embodiment may be adjustable such that the display panel 1516 may be positioned above or below the line of sight 1537.

Optionally, the display panel 1516 may be configured to have specific angular orientation 1535 with respect to the Z-axis 1534. For example, the display panel 1516 may be configured to have a 3 to 4 degree angle of rotation about the Z-axis 1534. In some embodiments, the display panel 1516 is rotated about the Z-axis 1534 less than 45 degrees relative to the horizontal plane. Additionally, the display panel 1516 may be configured such that the orientation of the display panel about the Z-axis 1534 is adjustable.

Further, in some embodiments, the display panel 1516 is disposed such that the display panel has a location along the Z-axis 1534. For example, the display panel 1516 may be positioned along the Z-axis 1534 approximately 5 to 50 millimeters from the eye 1519. Though not shown, the Z-axis 1534 in some embodiments may be defined by a line of sight 1537 of the human visual system (not shown). For some embodiments, the display panel may be positioned such that the display panel occupies the field of view that is less than 120 degrees but greater than 15 degrees.

Figure 15B:
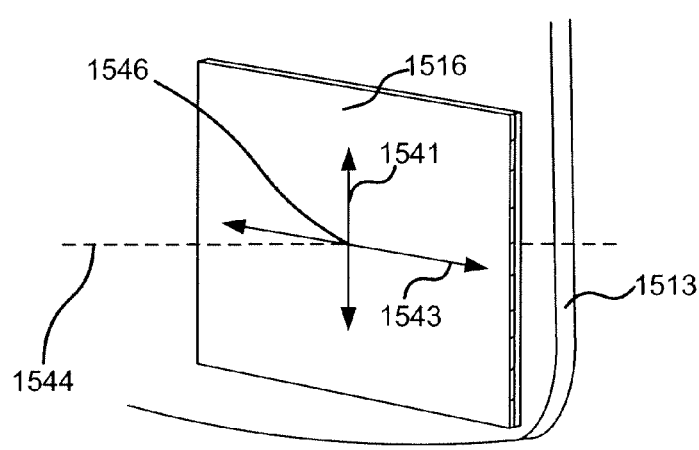
FIG. 15B is an illustration of an example configuration of a display optically disposed on a head-borne apparatus and adjustable along the X, Y, and Z axes.

Additionally, the display panel 1516 may be disposed on the head-borne apparatus 1513 such that the display panel has an X orientation and a Y orientation about a gaze axis 1544. FIG. 15B provides an illustration of such an embodiment where the display optically disposed on the head-borne apparatus 1513 and adjustable along the X and Y axes. As illustrated, the display panel 1516 may be positioned along the X-axis 1543 and a Y-axis 1541. In some embodiments, the geometric center 1546 of the display panel 1516 is positioned at an X position and an Y position such that the geometric center 1546 deviates less than 10 mm along the X-axis and Y-axis with respect to the gaze axis 1544. Optionally, for some embodiments, the geometric center 1546 of the display 1516 is adjustable in both the X and Y positions.

With respect to the display image, display panel 1516 may be controlled to maintain a desired perimetric shape, which may be adjustable. For example, the display panel image may be determined by an electronic trapezoidal distortion correction. In yet further embodiments, the display panel 1516 may have a display panel image that is modulated to compensate for any angular misalignment with a specific visual axis.

For some embodiments, the size of the display panel pixel is determined based on a desired visual angle. For example, an embodiment of the invention may have a display panel pixel size that subtends an angle proximately less than 6 minutes of arc. Additional embodiments may have a display panel having a display panel pixel size that subtends an angle proximately spent 2 minutes of arc. Further, in some embodiments, the brightness of the display panel as seen by the viewer is adjustable. Alternative embodiments may have a display panel having a brightness of less than 400 $Cd/m^2$ but greater than 0.5 $Cd/m^2$. Yet further embodiments may have a display panel having a brightness of 3000 $Cd/m^2$ but greater than 50 $Cd/m^2$. The brightness level of the display panel is typically determined based on display panel configuration, head-borne apparatus configuration, or a combination thereof.

Figure 16:
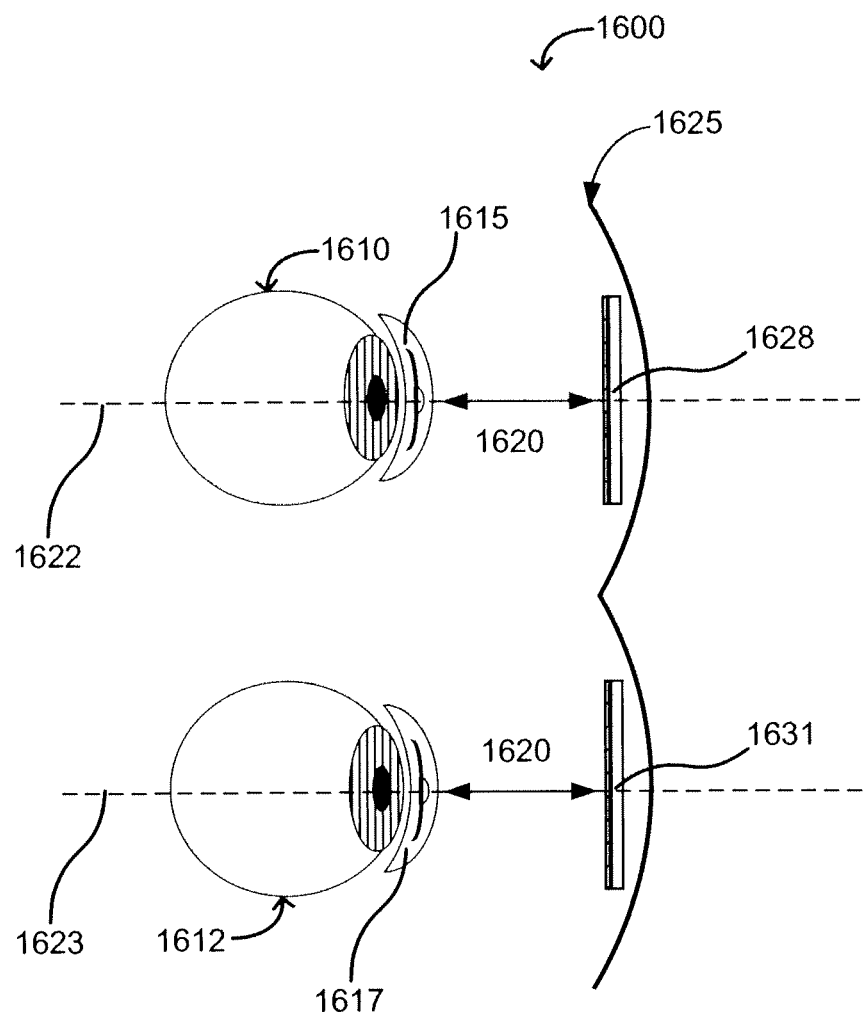
FIG. 16 is an illustration of an example configuration of a left display and a right display disposed on a head-borne apparatus and positioned in close proximity to both left and right eyes.

FIG. 16 is an illustration of an example configuration 1600 of a left display 1628 and a right display 1631 disposed on a head-borne apparatus 1625 and positioned in close proximity to a left eye 1610 and a right eye 1612. As illustrated, the left and right displays are disposed on the head-borne apparatus 1625 such that both displays are in close proximity to the left and right eye of the viewer. The distance 1620 between the displays and their respective eyes is such that both eyes are unable to focus on their respective displays unassisted. Though not illustrated, in some embodiments the distance between the left display 1628 and the left eye 1610 may be different from the distance between the right display 1631 and the right eye 1612.

Both the left and the right displays are shown to be positioned such that their respective geometric centers are positioned relative to the anatomic center 1622 and 1623 of the left and right eyes. Contact lenses 1615 and 1617 are responsible for focusing the display image emitted by their respective display panels, similar to contact lens 1522.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A display system, comprising:
   a display disposed on a head-borne apparatus such that when a viewer is wearing the head-borne apparatus, the display is positioned in close proximity to an eye of the viewer such that the eye is unable to focus on the display unassisted; and
   a contact lens having focusing optics that assists the eye in focusing on the display;
   wherein the display has pixels and is configured without focusing optics, thereby allowing light emitted by the pixels to diverge unfocused, and where light received at the contact lens from the display is diverging.

2. The display system of claim 1, wherein the focusing optics includes a lens of 25 or more diopters.

3. The display system claim 1, wherein the display is further disposed such that an image surface of the display is at a first horizontal angle with respect to a line of sight of a human visual system.

4. The display system of claim 3, wherein the first angle is between 45 and 135 degrees.

5. The display system of claim 3, wherein the first angle is adjustable.

6. The display system of claim 1, wherein the display is further disposed such that the display has an orientation about a Z-axis.

7. The display system of claim 6, wherein the display is rotated about the Z-axis less than 45 degrees relative to a horizontal plane.

8. The display system of claim 6, wherein the orientation about the Z-axis is adjustable.

9. The display system of claim 1, wherein the display is further disposed such that the display has a location along a Z-axis.

10. The display system of claim 9, wherein the Z-axis is defined by a line of sight of the human visual system.

11. The display system of claim 9, wherein the display is positioned between 5 and 50 millimeters from the eye.

12. The display system of claim 1, wherein the display is further disposed such that the display has an X orientation and a Y orientation about a gaze axis.

13. The display system of claim 12, wherein a geometric center of the display is positioned at an X position and a Y position such that the geometric center deviates less than 10 millimeters in either the X orientation or the Y orientation with respect to the gaze axis when the human visual system is directed toward the geometric center of the display.

14. The display system of claim 12, wherein a geometric center of the display has an adjustable X position and an adjustable Y position.

15. The display system of claim 1, wherein the display has a display image that is controlled to maintain a desired perimetric shape.

16. The display system of claim 15, wherein the display image is determined by an electronic trapezoidal distortion correction.

17. The display system of claim 15, wherein the perimetric shape is adjustable.

18. The display system of claim 1, wherein the display has a display image that is modulated to compensate for angular misalignment with a visual axis.

19. The display system of claim 1, wherein the display has a display surface that is curved at a predetermined curvature that is spherical, cylindrical, aspherical, or rotationally asymmetrical.

20. The display system of claim 19, wherein the predetermined curvature conforms to a corresponding curvature of a spectacle lens.

21. The display system of claim 1, wherein the display has a display pixel size that subtends an angle approximately less than 6 minutes of arc.

22. The display system of claim 1, wherein the display has a display pixel size that subtends an angle approximately less than 2 minutes of arc.

23. The display system of claim 1, wherein brightness of the display as seen by the viewer is approximately between 0.5 and 400 Cd/m².

24. The display system of claim 1, wherein brightness of its display as seen by the viewer is approximately between 50 and 3000 Cd/m².

25. The display system of claim 1, wherein brightness of the display as seen by the viewer is adjustable.

26. The display system of claim 1, wherein the display as seen by the viewer occupies a field of view that is approximately between 15 and 120 degrees.

27. The display system of claim 1, wherein the display as seen by the viewer occupies a field of view that is greater than a first field of view the viewer can see at a single gaze angle.

28. A display system, comprising:
a first display panel disposed on a head-borne apparatus such that when a viewer is wearing the head-borne apparatus, the first display panel is positioned in close proximity to a first eye of the viewer such that the first eye is unable to focus on the first display panel unassisted, and such that a first geometric center of the first display panel is set to a first position relative to a first anatomic center of a first pupil of the first eye for a first defined plane of gaze;
a second display panel disposed on the head-borne apparatus such that when the viewer is wearing the head-borne apparatus, the second display panel is positioned in close proximity to a second eye of the viewer such that the second eye is unable to focus on the second display panel unassisted, and such that a second geometric center of the second display panel is set to a second position relative to a second anatomic center of a second pupil of the second eye for a second defined plane of gaze;
a first contact lens having focusing optics that assists the first eye in focusing on the display panel; and
a second contact lens having focusing optics that assists the second eye in focusing on the display panel;
wherein both the first and second display panels have pixels, and are configured without focusing optics, thereby allowing light emitted by the pixels to diverge unfocused, and where light received at the contact lens from the display is diverging.

29. The display system of claim 28, wherein the first position of the first geometric center is substantially equal to a first pupillary distance measure at a gaze of approximately 6 meters or greater, and wherein the second position of the second geometric center is substantially equal to a second pupillary distance measure at a gaze of approximately 6 meters or greater.

30. The display system of claim 28, wherein the first position of the first geometric center is substantially equal to a first pupillary distance measure at a gaze of approximately 1 to 6 meters, and wherein the second position of the second geometric center is substantially equal to a second pupillary distance measure at a gaze of approximately 1 to 6 meters.

31. The display system of claim 28, wherein the first position of the first geometric center is substantially equal to a first pupillary distance measure at a gaze of approximately less than 1 meter, and wherein the second position of the second geometric center is substantially equal to a second pupillary distance measure at a gaze of approximately less than 1 meter.

32. The display system of claim 28, wherein the first position of the first geometric center is determined by a first measurement of the first eye from a first midline position of the head-borne apparatus, and wherein the second position of the second geometric center is determined by a second measurement of the second eye from a midline position of the head-borne apparatus.

33. The display system of claim 28, wherein the first position of the first geometric center is determined by a first measurement of a first vertical difference of a first height of a first pupil center of the first eye from a horizontal position of the head-borne apparatus, and wherein the second position of the second geometric center is determined by a second measurement of a second vertical difference of a second height of a second pupil center of the second eye from a horizontal position of the head-borne apparatus.

34. The display system of claim 28, wherein the first position of the first geometric center is adjustable, and wherein the second position of the second geometric center is adjustable.

* * * * *